(12) United States Patent
Schroth et al.

(10) Patent No.: US 10,146,695 B2
(45) Date of Patent: Dec. 4, 2018

(54) SYSTEM AND METHOD FOR IMPLEMENTING AN EFFICIENT LARGE SYSTEM PAGE INVALIDATION

(71) Applicants: David W Schroth, Roseville, MN (US); Kerry M Langsford, Roseville, MN (US); Max J Heimer, Roseville, MN (US); Michael J Rieschl, Roseville, MN (US)

(72) Inventors: David W Schroth, Roseville, MN (US); Kerry M Langsford, Roseville, MN (US); Max J Heimer, Roseville, MN (US); Michael J Rieschl, Roseville, MN (US)

(73) Assignee: UNISYS CORPORATION, Blue Bell, PA (US)

( * ) Notice: Subject to any disclaimer, the term of this patent is extended or adjusted under 35 U.S.C. 154(b) by 49 days.

(21) Appl. No.: 15/272,757

(22) Filed: Sep. 22, 2016

(65) Prior Publication Data
US 2018/0081805 A1    Mar. 22, 2018

(51) Int. Cl.
| | | |
|---|---|---|
| *G06F 12/0808* | (2016.01) | |
| *G06F 12/1009* | (2016.01) | |
| *G06F 12/128* | (2016.01) | |
| *G06F 12/1027* | (2016.01) | |

(52) U.S. Cl.
CPC ...... *G06F 12/1009* (2013.01); *G06F 12/1027* (2013.01); *G06F 2212/1024* (2013.01); *G06F 2212/683* (2013.01); *G06F 2212/69* (2013.01)

(58) Field of Classification Search
CPC ............ G06F 12/0808; G06F 12/1009; G06F 12/128; G06F 2212/69; G06F 12/10; G06F 12/1027; G06F 12/1036; G06F 2212/1024; G06F 2212/683
See application file for complete search history.

(56) References Cited

U.S. PATENT DOCUMENTS

| | | | | |
|---|---|---|---|---|
| 5,339,449 A | * | 8/1994 | Karger | G06F 9/54 710/6 |
| 6,490,671 B1 | * | 12/2002 | Frank | G06F 12/1027 711/202 |
| 6,651,132 B1 | * | 11/2003 | Traut | G06F 12/10 711/203 |
| 2015/0347301 A1 | * | 12/2015 | Gschwind | G06F 3/0619 711/135 |
| 2015/0347306 A1 | * | 12/2015 | Gschwind | G06F 12/0815 711/3 |

* cited by examiner

*Primary Examiner* — Yaima Rigol

(57) ABSTRACT

An apparatus includes a memory and a processor coupled to the memory. The processor is configured to perform the steps of: receiving a first head link for a page invalidation chain, the page invalidation chain including a plurality of page invalidation tables (PITs); receiving a second head link for an active real page table (RPT) chain, the active RPT chain including a plurality of RPTs; accessing a PIT, wherein the PIT includes a first data structure and a second data structure; invalidating the one or more RPTs, whereas the one or more RPTs are invalidated simultaneously in a batch; and releasing the one or more RPTs to a free RPT chain, the free RPT chain includes a plurality of released RPTs.

20 Claims, 14 Drawing Sheets

US 10,146,695 B2

SYSTEM AND METHOD FOR IMPLEMENTING AN EFFICIENT LARGE SYSTEM PAGE INVALIDATION

FIELD OF THE DISCLOSURE

The instant disclosure relates generally to increasing the processing speed of mainframe computing systems. More specifically, this disclosure relates to embodiments of apparatuses, systems, and methods that implement page invalidation methods that increase the efficiency of multiprocessor computing systems.

BACKGROUND

Processors in a modern computing system use absolute (virtual) addresses, instead of physical addresses, for addressing instructions and data for the purpose to expand the addressing capacity beyond what would be limited by the physical capacity. However, the processors of the computing system need to translate the virtual addresses back to physical addresses at some point during the processing of instructions and/or accessing data. To avoid using extra memory resource of additional memory structures to obtain the physical addresses corresponding to absolute addresses, processors typically keep a number of recent translations in a memory structure called a Translation Look-aside Buffer (TLB). TLB is a part of a processor cache. Every single processor in a multi-processor system may have its own cache and/or TLB.

The term "paging" refers to the mapping of an absolute address to a physical address. When the mapping of an absolute address to a physical address changes in a multi-processor system, every single TLB of each processor needs to be updated with the new mapping. The process of removing the old mapping of a TLB and updating it with the new mapping is called "page invalidation" or "TLB shoot down."

Page invalidation of a multi-processor computing system produces a significant computational overhead that slows down the overall system processing speed. Time latencies normally exist among TLB shoot downs of different processors. In many situations, the multi-processor computing system cannot proceed until all TLBs are updated. Therefore, significant amount of processor resources are wasted on waiting for all the page invalidations to be completed. In modern multi-processor computing system, page invalidation presents a bottle neck to the overall computation efficiency.

The page invalidation process posts even more serious slowdowns when the TLBs need to be updated are relatively large. For example, a 32 instruction processors (IPs) computing system with 32 GB of physical cache memory may spend >90% of its processor cycles handling the page invalidation wherein 5 GB physical memory needs to be invalidated.

Embodiments of apparatuses, systems, and methods disclosed herein implement page invalidation methods that increase the efficiency of multiprocessor computing systems.

SUMMARY

The instant disclosure relates generally to increasing the processing speed of mainframe computing systems. More specifically, this disclosure relates to embodiments of apparatuses, systems, and methods that implement page invalidation methods that increase the efficiency of multiprocessor computing systems. According to one embodiment of the disclosure, a method includes a step of receiving, at a processor, a first head link for a page invalidation chain, the page invalidation chain including a plurality of page invalidation tables (PITs). The method further includes receiving, at the processor, a second head link for an active real page table (RPT) chain, the active RPT chain including a plurality of RPTs. The method further includes accessing, by the processor, a PIT, wherein the PIT includes a first data structure and a second data structure, the first data structure further including a plurality of absolute addresses corresponding to one or more RPTs, and the second data structure further including a processor mask, wherein the processor mask is configured such that the processor is aware of page invalidation statuses of other processors. The method further includes invalidating, by the processor, the one or more RPTs, whereas the one or more RPTs are invalidated simultaneously in a batch. The method further includes releasing, by the processor, the one or more RPTs to a free RPT chain, the free RPT chain includes a plurality of released RPTs.

According to one embodiment of the disclosure, a computer program product includes a non-transitory computer-readable medium comprising instructions which, when executed by a processor, cause the processor to perform the steps of: receiving a first head link for a page invalidation chain, the page invalidation chain including a plurality of page invalidation tables (PITs); receiving a second head link for an active real page table (RPT) chain, the active RPT chain including a plurality of RPTs; accessing a PIT, wherein the PIT includes a first data structure and a second data structure, the first data structure further including a plurality of absolute addresses corresponding to one or more RPTs, and the second data structure further including a processor mask, wherein the processor mask is configured such that the processor is aware of page invalidation statuses of other processors; invalidating the one or more RPTs, whereas the one or more RPTs are invalidated simultaneously in a batch; and releasing the one or more RPTs to a free RPT chain, the free RPT chain includes a plurality of released RPTs.

According to one embodiment of the disclosure, an apparatus, includes a memory; and a processor coupled to the memory, the processor being configured to perform the steps of: receiving a first head link for a page invalidation chain, the page invalidation chain including a plurality of page invalidation tables (PITs); receiving a second head link for an active real page table (RPT) chain, the active RPT chain including a plurality of RPTs; accessing a PIT, wherein the PIT includes a first data structure and a second data structure, the first data structure further including a plurality of absolute addresses corresponding to one or more RPTs, and the second data structure further including a processor mask, wherein the processor mask is configured such that the processor is aware of page invalidation statuses of other processors; invalidating the one or more RPTs, whereas the one or more RPTs are invalidated simultaneously in a batch; and releasing the one or more RPTs to a free RPT chain, the free RPT chain includes a plurality of released RPTs.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
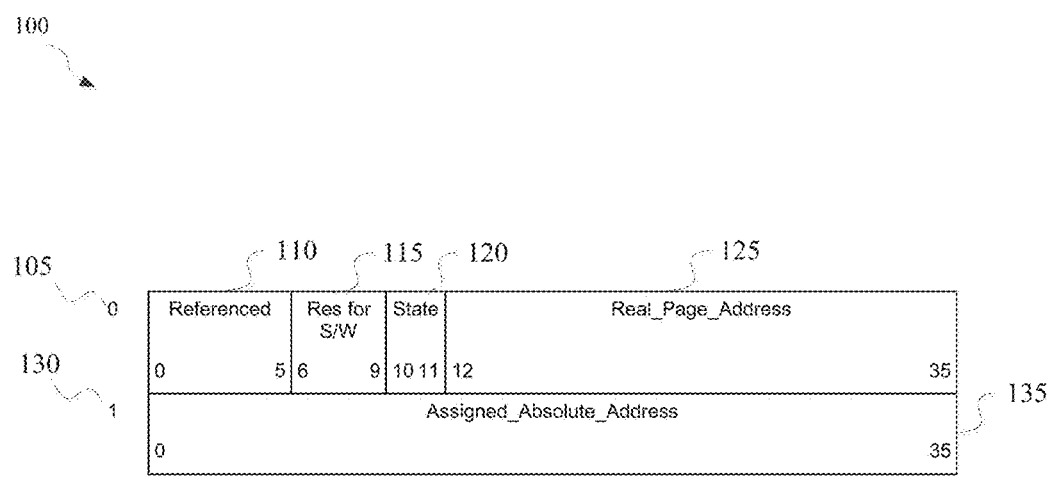
FIG. 1 shows a Page_Descriptor according to one embodiment of the disclosure.

Embodiments disclosed herein include new data structures facilitating page invalidation. The data structures disclosed support batch processing of page invalidations, and the data structures are cache-aware. The term "cache-aware" means one processor running the page invalidation algorithm is aware of whether other processors in the system have or have not completed the page invalidation. In one embodiment, a page invalidation chain includes a plurality of page invalidation tables (PITs). Each PIT includes two data structures, wherein the first data structure supports batch processing of page invalidation and the second data structure includes processor masks configured to make the current processor being aware of the invalidation statutes of all other processors in the system.

In one embodiment, the new data structure is a page invalidate table (PIT) packet that consists of two parts. In one embodiment, one part may contain the data that is only (or mostly) read by the instruction processor (IP) running the page invalidate chain. In another embodiment, the other part may contain data bits that are updated (under storage lock) according to other IPs' invalidation statutes.

In yet another embodiment, the first part of the PIT packet may contain the links to the prior and next PIT packets, a doubly-linked list of real page table (RPT) entries of the pages associated with the PIT packet, and an absolute address range (starting absolute address and length in words) to invalidate. This first part of the PIT packet may reduce or eliminate cache contention. In one embodiment, the second part of the PIT packet may contains the mask of IPs that need to invalidate the absolute address range. This second part of the PIT packet may reduce or eliminate interprocessor interrupts.

The terms "absolute address" and "virtual address" are used interchangeably in this disclosure. The terms "physical address" and "real address" are used interchangeably in this disclosure. The terms "processor" and "instruction processor (IP)" are used interchangeably in this disclosure.

The terms "Absolute_Address," "Virtual_Address," "Physical_Address," "Real_Address," or the like refer to parameters physically stored in a computer-readable memory implementing the concepts of "absolute address," "virtual address," "physical address," "real address," or the like respectively. Accessing, locking, isolating, updating, deleting, and writing the above mentioned addresses mean physically accessing, locking, isolating, updating, deleting, and writing the corresponding computer-readable memory.

An "instruction" is executed by any suitable processor, for example, x86 processors. An instruction may be programmed in any suitable computer language, for example, machine codes, assembly language codes, C language codes, COBOL codes, C++ language codes, Fortran codes, Java codes, Matlab codes, or the like.

"Initialize" a parameter means preparing the appropriate physical capacity and physical structure on the computer readable medium for the parameter, such that the parameter is configured to perform its appropriate functionalities, e.g., being accessed, being locked, being updated, being deleted, being wrote, etc by instruction processors.

Computer-readable medium is non-transitory memory storage. Computer-readable medium includes physical computer storage media. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable medium. The terms "computer-readable medium" and "computer-readable memory" are used interchangeably in this disclosures.

"CR(Word, Value)" is an instruction used in the embodiments. The instruction CR (Conditional Replace) causes a single store or write to a computer-readable memory (indivisible operation). If the store or write is unsuccessful, the method shall wait and repeat.

"LOCK(semaphore)" is an instruction used in the embodiments. This instruction is a lock on a semaphore. This instruction physically isolates a variable on a computer-readable medium from being accessed or updated by any other processor or computer program. If the lock cannot be granted, the instruction processor shall wait and repeat. A semaphore is a parameter or data structure that is used for controlling access, by multiple processors, to a common resource in a multi-processor system.

"UNLOCK(semaphore)" is an instruction used in the embodiments. This instruction unlocks the semaphore. This instruction releases the physical isolation of the locked variable for other processors or computer programs to access and/or update.

"INV(AbsoluteAddress)" is an instruction used in the embodiments. This instruction INV (invalidate) causes the instruction processor to clear the TLB buffer for the specified absolute address.

"LATP(PTP, PTOSS)" is an instruction used in the embodiments. The LATP (Load Address Translation Parameters) instruction initializes the real starting address of the page table (PT) for this IP and determines the width of the page table offset (PTO) field, which is also the length of the page table without the Page_Table_Extensions (PTX). "PTOSS" stands for Page Table Offset Size Select. "PTP" stands for Page Table Pointer.

The symbol ":=" means setting the value. For one example, "A:=B" means setting the value of A as B, wherein A and B are two different variables. For another example, "Entry(head).Prev:=Link" means setting the value of Entry (head).Prev as Link.

"CHAIN(Link, Head)" is an instruction used in the embodiments. This instruction chains a data entry to a single linked list. In one embodiment, the instruction includes the following steps: (1) If Head=0 then go to step 3; (2) Entry(head).Prev:=Link; (3) Entry(Link).Prev:=0; (4) Entry(Link).Next:=Head; (5) CR(Head):=Link; If unsuccessful then waits and repeats step 5; and (6) Exit.

"UNCHAIN(Link, Head)" is an instruction used in the embodiments. This instruction unchains a data entry from a single linked list. In one embodiment, the instruction includes the following steps: (1) If Entry(Link).Prev not equal 0 then go to the next step, else go to step 3; (2) Entry(Entry(Link).Prev).Next:=Entry(Link).Next; go to step 4; (3) CR(Head):=Entry(Link).Next; If unsuccessful then waits and repeats step 3; (4) If Entry(Link).Next not equal 0 then go to the next step, else go to step 6; (5) Entry(Entry(Link).next).Prev:=Entry(Link).Prev; and (6) Exit.

"Page Table (PT)" is the primary data structure used during the paging operation. "Paging table entries (PTE)" are maintained under one PT and its Page_Table_Extensions (PTX).

The PT is accessed by hashing the absolute address (Absolute_Address). In one embodiment, the Absolute_Address is used as an operand in the page invalidation. The portion of the absolute address being selected is determined by parameters of the Load Address Translation Parameters instruction (LATP). Since only a portion of the absolute address is used, it is possible to have multiple Absolute_Addresses hash to the same PTE.

In one embodiment, the PT is a series of multi word PTEs used to resolve address conflicts among PTEs. The real starting address of the PT is determined by the LATP instruction. The LATP Page Table Offset Size Select (PTOSS) determines the size of the PT. This same PTOSS determines the number of Absolute_Address bits to use for the initial hash into the PT. The size of the PT should be large enough to contain 2n entries, where n is the number of bits of the initial hash of the Absolute_Address. In some embodiments, the PT contains two to four times as many entries as there are possible pages in real memory in order to avoid conflicts. The Page_Table_Extensions (PTX) should contain enough entries to resolve conflicts based on the size of the Absolute_Address.

The entries in the PTX are addressed by the following values, all aligned on the least significant bit: Page_Table_Extension_Pointer (PTXP), the Real_Address of the PT, and left shifted by one bit with zero fill, the next 4 bits of Absolute_Address. The PTX addresses and the Real_Addresses of the PT shall be carefully selected for correct operation of PTX entry addressing.

When two Absolute_Addresses hash to the same PTE, the existing Page_Descriptor (PD) is changed to a PTXP by the page management software that is adding the conflicting address. The PTXP selects a 16-entry PTX. One of the 16 PTX entries is selected by hashing the four next more significant bits of the Absolute_Address. Each PTX resolves up to 16 Absolute_Addresses that hash to one entry. Conflicts in the PTX are resolved by cascading to another PTX. The process of avoiding conflicts of PDs continues until the most significant bits of the Absolute_Address have been hashed. In one embodiment, the PT is a tree structure; the leaves are PDs and the nodes are PTXPs, each connecting up to 16 combined leaves and nodes.

In one embodiment, the page table entry (PTE) may have four states (PTE.State). In one embodiment, when PTE.State=0, the data structure is a Page_Descriptor (PD). In one embodiment, when PTE.State=1, the data structure is a Page_Exception_PTE. In one embodiment, when PTE.State=2, the data structure is a Page_Table_extension_Pointer (PTXP). In one embodiment, when PTE.State=3, the data structure is a Page_Exception_PTE.

Dummy variables "n," "m," "N," "Y," or the like in this disclosure may be 0 or any positive integer, unless otherwise specified. Certain mathematical relationships may exist among the dummy variables.

FIG. 1 shows a Page_Descriptor (PD) 100 according to one embodiment of the disclosure. The PD 100 may be the data structure when PTE.State=0. The PD 100 can be used in combination with the Page_Exception_PTE 200 in FIG. 2. The PD 100 can be used in combination with the Page_Table_extension_Pointer 300 in FIG. 3. The PD 100 can be used in combination with the RPT 400 in FIG. 4. The PD 100 can be used in combination with the Page Invalidate Table Packet 500 in FIG. 5. The PD 100 can be included in the method 600 in FIG. 6. The PD 100 can be included in the method 700 in FIG. 7. The PD 100 can be included in the method 800 in FIG. 8. The PD 100 can be included in the method 900 in FIG. 9. The PD 100 can be included in the method 1000 in FIG. 10. The PD 100 may be included in the data structures 1100 in FIG. 11. The PD 100 may be used in the computer network 1200 in FIG. 12. The PD 100 may be used in the computer system 1300. The PD 100 may be used in the server 1400 in FIG. 14A. The PD 100 may be used in the server 1450 in FIG. 14B.

PD 100 may provide the translation of Assigned_Absolute_Address 135 (absolute address) to Real_Page_Address 125 (physical address) for each page so described.

As shown in FIG. 1, PD 100 is a two word structure including word 0 105 and word 1 130. Word 0 105 includes 36 bits. Word 0 bits 0-5 are referenced 110. Referenced 110:=000001 (binary) by hardware when the entry is accelerated into the IP's Translation Lookaside Buffer (TLB) indicating that the page has been referenced. Referenced 110 exists to help software determine which pages need to be kept in storage. Hardware sets Referenced:=000001 (binary) at TLB acceleration. Referenced is a 1 bit indicator that hardware indivisibly writes as a sixth of a word.

As shown in FIG. 1, word 0 bits 6-9 115 are reserved for software.

As shown in FIG. 1, word 0 bits 10-11 are state 120. In one embodiment, state=0, data structure is PD. In one embodiment, if the Assigned_Absolute_Address 135 of the entry matches the most significant bits (ignoring the least significant bits of the Absolute_Address that provide the offset within the page) of the Absolute_Address being translated, the Real_Page_Address 125 is the Real_Address of the page being referenced. If the Absolute_Address does not match, generate a Page_Exception interrupt.

As shown in FIG. 1 word 0 bits 12-35 are Real_Page_Address 125. In one embodiment, Real_Page_Address 125 is the address of the page in real storage right shifted 12 bits to remove the offset within the page with page size granularity of 4,096 words.

As shown in FIG. 1, word 1 bits 0-35: Assigned_Absolute_Address 135. In one embodiment, word 1 contains the most significant bits (ignoring the 18 least significant bits of the address) of the Absolute_Address of this page. In other embodiments, for models that implement less than the full architecturally defined Absolute_Address size, those bits of Assigned_Absolute_Address 135 beyond the implemented Absolute_Address size are defined as Must_Be_Zero.

Figure 2:
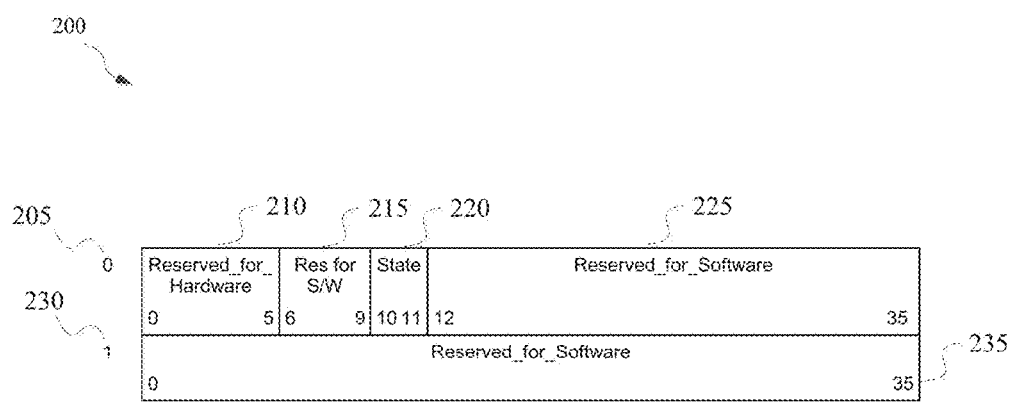
FIG. 2 shows a Page_Exception_PTE according to one embodiment of the disclosure.

FIG. 2 shows a Page_Exception_PTE 200 according to one embodiment of the disclosure. The Page_Exception_PTE 200 can be the data structure when PTE.State=1 or 3. The Page_Exception_PTE 200 can be used in combination with the PD 100 in FIG. 1. The Page_Exception_PTE 200 can be used in combination with the Page_Table_Extension_Pointer 300 in FIG. 3. The Page_Exception_PTE 200 can be used in combination with the RPT 400 in FIG. 4. The Page_Exception_PTE 200 can be used in combination with the Page Invalidate Table Packet 500 in FIG. 5. The Page_Exception_PTE 200 can be included in the method 600 in FIG. 6. The Page_Exception_PTE 200 can be included in the method 700 in FIG. 7. The Page_Exception_PTE 200 can be included in the method 800 in FIG. 8. The Page_Exception_PTE 200 can be included in the method 900 in FIG. 9. The Page_Exception_PTE 200 can be included in the method 1000 in FIG. 10. The Page_Exception_PTE 200 may be included in the data structures 1100 in FIG. 11. The Page_Exception_PTE 200 may be used in the computer network 1200 in FIG. 12. The Page_Exception_PTE 200 may be used in the computer system 1300. The Page_Exception_PTE 200 may be used in the server 1400 in FIG. 14A. The Page_Exception_PTE 200 may be used in the server 1450 in FIG. 14B.

In one embodiment, Page_Exception_PTE 200 generates a Page_Exception interrupt when the PTE is accessed by hardware when trying to find a PD to translate an Absolute_Address into a Real_Address, in the situations that page management software has either not yet defined a PD or wants to prevent further access to the page.

As shown in FIG. 2, Page_Exception_PTE 200 entries are 2 word structures including word 0 205 and word 1 230.

As shown in FIG. 2, word 0 bits 0-5 are Reserved_for_Hardware 210. Word 0 bits 6-9 are Reserved_for_Software 215.

As shown in FIG. 2, word 0 bits 10-11 are State 220. In one embodiment, when state 220 is 1, Page_Exception_PTE 200 generates a Page_Exception interrupt; do not access the page. In another embodiment, when state 220 is 3, hardware generates a Page_Exception interrupt. In another embodiment, when state 220 is 3, page management software may have made serious errors to permit this value in the PTE or may have deliberately set State:=3.

As shown in FIG. 2, word 0 Bits 12-35 are Reserved_for_Software 225. Word 1 bits 0-35 are Reserved_for_Software 235.

Figure 3:
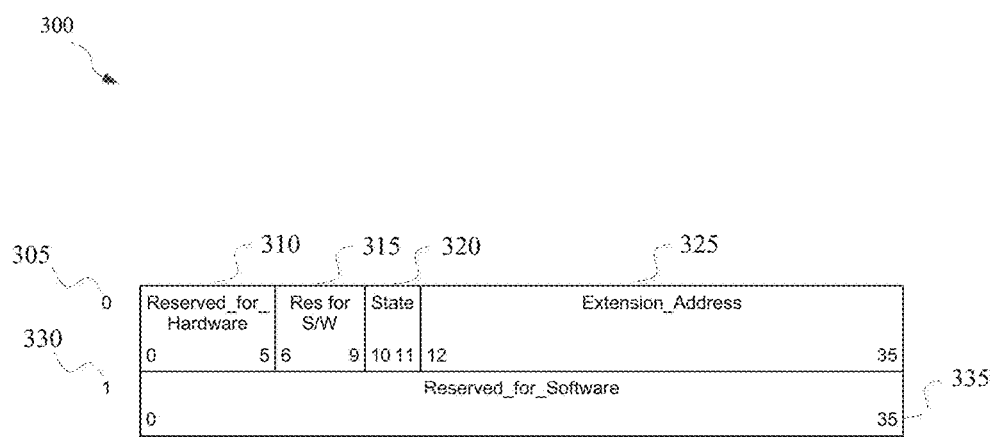
FIG. 3 shows a Page_Table_Extension_Pointer according to one embodiment of the disclosure.

FIG. 3 shows a Page_Table_Extension_Pointer (PTXP) 300 according to one embodiment of the disclosure. The Page_Table_Extension_Pointer 300 can be the data structure when PTE.State=2. The Page_Table_Extension_Pointer 300 can be used in combination with the PD 100 in FIG. 1. The Page_Table_Extension_Pointer 300 can be used in combination with the Page_Exception_PTE 200 in FIG. 2. The Page_Table_Extension_Pointer 300 can be used in combination with the RPT 400 in FIG. 4. The Page_Table_Extension_Pointer 300 can be used in combination with the Page Invalidate Table Packet 500 in FIG. 5. The Page_Table_Extension_Pointer 300 can be included in the method 600 in FIG. 6. The Page_Table_Extension_Pointer 300 can be included in the method 700 in FIG. 7. The Page_Table_Extension_Pointer 300 can be included in the method 800 in FIG. 8. The Page_Table_Extension_Pointer 300 can be included in the method 900 in FIG. 9. The Page_Table_Extension_Pointer 300 can be included in the method 1000 in FIG. 10. The Page_Table_Extension_Pointer 300 may be included in the data structures 1100 in FIG. 11. The Page_Table_Extension_Pointer 300 may be used in the computer network 1200 in FIG. 12. The Page_Table_Extension_Pointer 300 may be used in the computer system 1300. The Page_Table_Extension_Pointer 300 may be used in the server 1400 in FIG. 14A. The Page_Table_Extension_Pointer 300 may be used in the server 1450 in FIG. 14B.

In one embodiment, the Page_Table_Extension_Pointer (PTXP) 300 can exist anywhere in the PT and PTXs except as a leaf node. In other embodiments, the Page_Table_Extensions (PTX) may be used to handle conflicts of multiple pages hashing to one entry in the Page Table. Each entry in a used PTX should be explicitly defined with PTE.State=0, 1, 2, or 3.

As shown in FIG. 3, PTXP 300 entries are 2 word structures including word 0 305 and word 1 330.

As shown in FIG. 3, word 0 Bits 0-5 are Reserved_for_Hardware 310. Word 0 Bit 6-9 are Reserved_for_Software 315.

As shown in FIG. 3, word 0 bits 10-11 are State 320. In one embodiment, when state is 2, PTXP 300 is a pointer pointing to the Page_Table_Extension.

As shown in FIG. 3, word 0 bits 12-35 are Extension_Address 325. Extension_Address is the offset to a Page_Table_Extension. The value is left shifted 5 bits with zero fill and ORed with the Page Table start address to form the Real_Address of the PTX. (Question: what does ORed mean? Please define "OR.")

As shown in FIG. 3, word 1 bits 0-35 are Reserved_for_Software 335.

Figure 4:
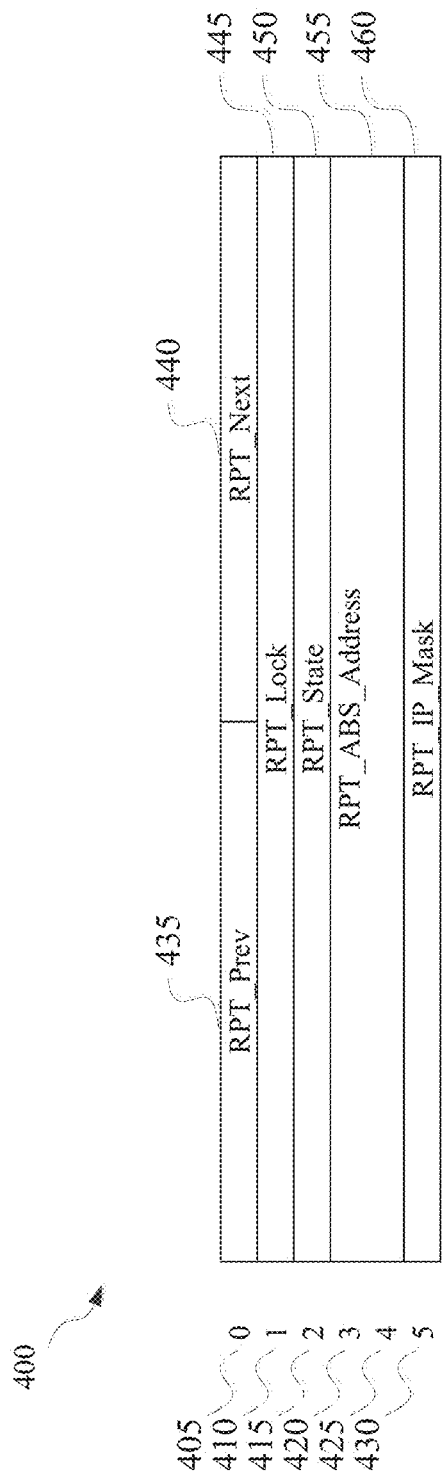
FIG. 4 shows a Real Page Table (RPT) Entry according to one embodiment of the disclosure.

FIG. 4 shows a Real Page Table (RPT) 400 Entry according to one embodiment of the disclosure. The RPT 400 can be used in combination with the PD 100 in FIG. 1. The RPT 400 can be used in combination with the Page_Exception_PTE 200 in FIG. 2. The RPT 400 can be used in combination with the Page_Table_Extension_Pointer 300 in FIG. 3. The RPT 400 can be used in combination with the Page Invalidate Table Packet 500 in FIG. 5. The RPT 400 can be included in the method 600 in FIG. 6. The RPT 400 can be included in the method 700 in FIG. 7. The RPT 400 can be included in the method 800 in FIG. 8. The RPT 400 can be included in the method 900 in FIG. 9. The RPT 400 can be included in the method 1000 in FIG. 10. The RPT 400 may be included in the data structures 1100 in FIG. 11. The RPT 400 may be used in the computer network 1200 in FIG. 12. The RPT 400 may be used in the computer system 1300. The RPT 400 may be used in the server 1400 in FIG. 14A. The RPT 400 may be used in the server 1450 in FIG. 14B.

The RPT 400 is a control table for working set management of real memory. There is one entry for each page in the real address space. RPT 400 includes six words: word 0 405, word 1 410, word 2 415, word 3 420, word 4 425, and word 5 430.

Word 0 405 includes RPT_PREV 435 and RPT_Next 440. RPT_PREV 435 may be a link to the previous page on the free list/recovery list/any other page list. RPT_Next 440 may be a link to the next page on the free list/recovery list/any other page list.

Word 1 410 includes RPT_Lock 445. RPT_Lock 445 may be a semaphore.

Word 2 415 includes RPT_State 450. In one embodiment, when RPT_State 450 is 0, the page list=Free. When RPT_State 450 is 1, the page list=Active. When RPT_State 450 is 2, the page list=Invalidate.

Word 3 420 and 4 425 include RPT_ABS_Address 455. The RPT_ABS_Address 455 includes the absolute address of the page.

Word 5 includes RPT_IP_Mask 430. The RPT_IP_Mask 460 includes a mask of IPs in the system. The mask includes a plurality of bits, each bit correspond to one other IP in a multiprocessor computing system. The bits of the mask have two states: status zero and status one. Status zero indicates the corresponding IP has invalided the page in interest. Status one indicates the corresponding IP has not invalidated the page in interest yet. All bits in the mask must be zero before the RPT entry can be unchained from an active RPT chain and chained into a free page list. All bits in the IP mask being zero can be validated by the instruction RPT_INV (Real Page Table Invalidation) as TRUE. Updates of the bits of the mask must be made using the CR (Conditional Replace) instruction.

Figure 5:
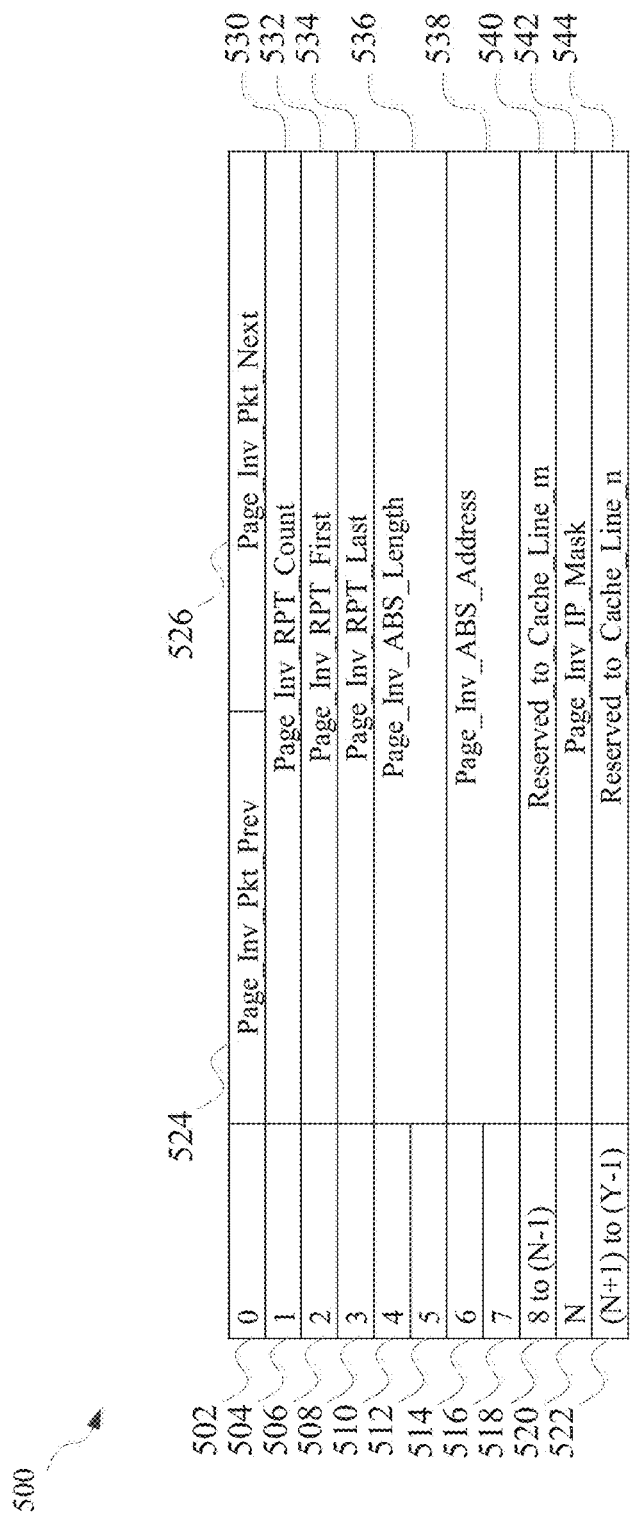
FIG. 5 shows a Page Invalidate Table Packet according to one embodiment of the disclosure.

FIG. 5 shows a Page Invalidate Table Packet 500 according to one embodiment of the disclosure. The Page Invalidate Table Packet 500 can be used in combination with the PD 100 in FIG. 1. The Page Invalidate Table Packet 500 can be used in combination with the Page_Exception_PTE 200 in FIG. 2. The Page Invalidate Table Packet 500 can be used in combination with the Page_Table_Extension_Pointer 300 in FIG. 3. The Page Invalidate Table Packet 500 can be used in combination with the RPT 400 in FIG. 4. The Page Invalidate Table Packet 500 can be used in the method 600 in FIG. 6. The Page Invalidate Table Packet 500 can be used in the method 700 in FIG. 7. The Page Invalidate Table Packet 500 can be used in the method 800 in FIG. 8. The Page Invalidate Table Packet 500 can be used in the method 900 in FIG. 9. The Page Invalidate Table Packet 500 can be used in the method 1000 in FIG. 10. The Page Invalidate Table Packet 500 may be included in the data structures 1100 in FIG. 11. The Page Invalidate Table Packet 500 may be used in the computer network 1200 in FIG. 12. The Page Invalidate Table Packet 500 may be used in the computer system 1300. The Page Invalidate Table Packet 500 may be used in the server 1400 in FIG. 14A. The Page Invalidate Table Packet 500 may be used in the server 1450 in FIG. 14B.

In one embodiment, the Page Invalidate Table Packet 500 is a structure used by Page Invalidation to reduce the overhead of Page Invalidation. The Page Invalidate Table Packet 500 describes an Absolute Address span to invalidate. The Page Invalidate Table Packet 500 has a chain of pages that are mapped to addresses within the Absolute Address span, and contains a bit map of all the IPs, e.g., an IP mask, that still need to invalidate the Absolute Address span.

In one embodiment, the page invalidate table packet 500 needs to be padded to the minimum spacing between lock cells required to ensure that they do not reside within the same cache line.

As shown in FIG. 5, the numbers on the left of the table 500 indicate the memory space of a word: the zero word 502, the first word 504, the second word 506, the third word 508, the fourth word 510, the fifth word 512, the sixth word 514, the seventh word 516, the 8th to (N−1)th words 518, the (N)th word 520, and the (N+1)th to (Y−1)th words 522, wherein (Y−1)>=(N+1).

Page_Inv_Pkt_Prev 524 includes a link to the previous page invalidate packet on the page invalidate chain.

Page_Inv_Pkt_Next 526 includes a link to the next page invalidate packet on the page invalidate chain.

Page_Inv_RPT_Count 530 includes a number of Real Page Table entries on the real_page_table_entry_chain.

Page_Inv_RPT_First 532 includes an index of the first Real Page Table entry on the real_page_table_entry_chain.

Page_Inv_RPT_Last 534 includes an index of the last Real Page Table entry on the real_page_table_entry_chain.

Page_Inv_ABS_Length 536 includes the length, in pages, of the Absolute Address span to invalidate.

Page_Inv_ABS_Address 538 includes the starting Absolute Address of the span of addresses to invalidate.

Page_Inv_IP_Mask 540 includes a mask of IPs in the system. The mask includes a plurality of bits, each bit correspond to one other IP in a multiprocessor computing system. The bits of the mask have two states: status zero and status one. Status zero indicates the corresponding IP has invalided the page in interest. Status one indicates the corresponding IP has not invalidated the page in interest yet. All bits in the mask must be zero before the RPT entry can be unchained from an active RPT chain and chained into a free page list. All bits in the IP mask being zero can be validated by the instruction RPT_INV (Real Page Table Invalidation) as TRUE. Updates of the bits of the mask must be made using the CR (Conditional Replace) instruction.

Reserved_to_cache_line_m 542 includes the number of reserve words needed to guarantee that Page_Inv_IP_Mask is within its own cache line.

Reserved_to_cache_line_n 544 includes the number of reserve words needed to guarantee that Page_Inv_IP_Mask is within its own cache line.

In some embodiments, the paging includes a "relative address." For example, in one embodiment, a relative address has to be translated to an absolute address, and then the absolute address has to be translated to a real address. In one embodiment, the Absolute_Address space is segmented into pages, wherein each page includes 4,096 words in length.

In one embodiment, the paging tables consist of two parts. One part is the Page Table, which is a hash table that requires enough contiguous real memory to hold 2*PTOSS Paging Table Entries (PTE). The other part is a collection of Page_Table_Extensions (not necessarily contiguous in real memory) used for resolving collisions in the hash table. Each Page_Table_Extension contains 16 PTEs.

A paging algorithm describes the translation of an Absolute_Address to a Real_Address in detail. In one embodiment, the PTOSS value selects bits from the Absolute_Address to use for a hash index into the Page Table. When multiple Absolute_Addresses resolve to the same PTE, the conflict is resolved by placing a Page_Table_Extension_Pointer at the hash location that points to a Page_Table_Extension. The next four more significant bits of Absolute_Address are used to select an entry in the Page_Table_Extension. If there is still a conflict, the process is repeated until there is a resolution. The algorithm produces a nonconflicting result by the time all of the Absolute_Address bits have been used or generates a Page_Exception interrupt.

In some embodiments, when paging is invoked, a PTE is read from the PT. If the PTE is a PTXP, one or more additional entries are read to eventually find a PD. The PD is read to determine if the PD is to be used for the translation. If not, the page is not resident and a Page_Exception interrupt is generated.

In some embodiments, the parameters necessary to control the paging operation are initialized by the Load Address Translation Parameters instruction (LATP). These maybe the Real_Address of the start of the PT and the number of bits of the Absolute_Address used to access the PT (that is, the size of the PTO field).

In some embodiments, multi-processor computing systems are equipped with a Translation Lookaside Buffer (TLB) per IP. The TLBs are used to hold the results of the most recent page address translations. When an Absolute_Address is to be translated, a check is made to see if an address within the same page has already been translated (resident in the TLB). If so, hardware may use the information stored in the TLB instead of undergoing a complete translation. In some cases, the TLB for an IP is completely invalidated as part of the LATP instruction execution on that IP. In some embodiments, the Invalidate_Page_Descriptor instruction (INV) is provided for an IP to invalidate its own individual TLB entries.

The following is a list of Page_Descriptor (PD) fields used in embodiments of paging algorithms. "PD.AAA" means PD Assigned_Absolute_Address. "PD.State" means PD State field. "PD.RPA" means PD Real_Page_Address. "PD.Referenced" means PD Referenced field.

The following is a list of addresses initialized by LATP instructions used in embodiments of paging algorithms. "PTSA" means Page Table Pointer. "PTOSS" means Page Table Offset Size Select.

The following is a list of absolute address fields used in embodiments of paging algorithms. "AAC" means Absolute_Address_Compare. "PTO" means Page Table Offset.

The following is a list of conceptual holding registers used in embodiments of paging algorithms. "RPSA" means Real Page Start Address. In one embodiment, RPSA holds n*4,096 words, where n is the Real_Page_Address from the PD used for translation and 4,096 words is page size.

In one embodiment, a method "Paging" for paging can include the following 14 steps. It is noted that the following method is only an embodiment of the disclosure and does not limit the scope of the disclosure in any manner. Step 1 of the method for paging may include that if an Absolute_Address is resident in a TLB then obtain a Real_Address of a first word of this page from the IP's TLB, place it into RPSA, and exit. Step 2 of the method for paging may include that if this Absolute_Address is not resident in the TLB. Extract from the Absolute_Address the number of bits specified by PTOSS beginning with the least significant bits that are more significant than the offset within the page (assuming a page size of 4K, extract PTOSS bits: 24 PTOSS, . . . , 21, 22, 23). Multiply this value by 2 to form PTO or PTO with PTSA. Read the PT.PTE as an indivisible operation. Step 3 of the method for paging may include that if PTE.State=0, go to step 9. Step 4 of the method for paging may include that if PTE.State=1, generate a Page_Exception interrupt and exit. Step 5 of the method for paging may include that if PTE.State=3, generate a Page_Exception interrupt and exit. Step 6 of the method for paging may include that if PTE.State=2, it means the page has a valid PTXP. If there are no more Absolute_Address bits remaining to hash, generate a Page_Exception interrupt and exit. Step 7 of the method for paging may include forming a new PTXP. Step 7 may further include obtaining the four next most significant bits of the Absolute_Address, multiply by 2. OR result with PTXP.EA*32, and OR that result with PTSA. (When at least one, but less than four, Absolute_Address bits remain, sufficient zeros are concatenated on the left to arrive at four bits.) Read the PTX.PTE as an indivisible operation at the address just calculated. (Question: what does ORed mean? Please define "OR.")

Step 8 of the method for paging may include going back to step 3 to check PTE.State. Step 9 of the method for paging may include that if PD.AAA is not equal to AAC (the desired address was not found), generate a Page_Exception interrupt and exit. Step 10 of the method for paging may include that if there is room in the IP's TLB for this PD, go to step 12. Step 11 of the method for paging may include selecting a location in the IP's TLB and displace the PD to make an entry available for this new PD. Step 12 of the method for paging may include that RPSA: =PD.RPA*4,096 (decimal page size). PD.Referenced:=000001 (binary). Step 13 of the method for paging may include entering into the IP's TLB: RPSA, a sufficient portion of the Absolute_Address being paged to later determine if the page is resident in the IP's TLB. Step 14 of the method for paging may include that OR RPSA and PAGE OFFSET of the Absolute_Address. The result is the Real_Address assigned to this Absolute_Address.

In one embodiment, an method "Delete_PD" for deleting Page_Descriptor (PD) may include the following nine steps. It is noted that the following method is only an embodiment of the disclosure and does not limit the scope of the disclosure in any manner. Step 1 of the method for deleting PD may include acquiring software lock associated with PT.PTE. Step 2 of the method for deleting PD may include that finding the desired PD (may be in PT or in a PTX). Step 3 of the method for deleting PD may include that, as a Conditional Replace (CR) single store (indivisible operation), PTE.State:=1, Page_Exception_PTE. More fields can be written as part of the indivisible store, but the values for RPA and AAA need not change due to the indivisible store. Step 4 of the method for deleting PD may include invalidating the TLB for the PD on all IPs using the INV instruction (removes TLB entry for page from the IPs). Step 5 of the method for deleting PD may include that if PD was in PT, go to step 9. Step 6 of the method for deleting PD may include that if node PTX has PTXPs, go to step 9. Step 7 of the method for deleting PD may include that if node PTX has more than one PD, go to step 9. Step 8 of the method for deleting PD may include removing PTX, pointing PTXP to either PD, for example, PTXP.AAA:=PD.AAA. As a Conditional Replace (CR) single store (indivisible operation) store word containing PD.Referenced, PD.Reserved_for_Software, PD.State (00), and PD.RPA as an indivisible operation into PTX.PTE. After step 8, the method may go back to step 6. Step 9 of the method for deleting PD may include releasing software lock associated with PT.PTE.

In another embodiment, a method "Define_PD" for defining Page_Descriptor (PD) may include the following four steps. It is noted that the following method is only an embodiment of the disclosure and does not limit the scope of the disclosure in any manner. Step 1 of the method for defining PD may include that if not entered from Define PTXP, acquire software lock associated with PT.PTE. Step 2 of the method for defining PD may include storing AAA. As a Conditional Replace (CR) single store (indivisible operation) store word containing PD.Referenced, PD.Reserved_for_Software, PD.State (00), and PD.RPA. Step 3 of the method for defining PD may include that if entered from the method for defining PTXP at step 7, return to the method for defining PTXP at step 8. Step 4 of the method for defining PD may include that releasing the software lock associated with PT.PTE.

In yet another embodiment, a method "Define_PTXP" for defining PTXP may include the following eight steps. It is noted that the following method is only an embodiment of the disclosure and does not limit the scope of the disclosure in any manner. Step 1 of the method for defining PTXP may include acquiring software lock associated with PT.PTE. Step 2 of the method for defining PTXP may include acquiring a PTX. Step 3 of the method for defining PTXP may include hashing the existing PD.AAA by obtaining the 4 next most significant bits of the Absolute_Address and multiply by 2. When at least one, but less than four, Absolute_Address bits remain, sufficient zeros are concatenated on the left to arrive at four bits. Step 4 of the method for defining PTXP may include copying the existing PD to the PTX at the appropriate entry. Step 5 of the method for defining PTXP may include, where the collision occurred as a single store (indivisible operation), storing into the existing PTE the newly created PTXP for the PTX acquired including PTXP. Step 6 of the method for defining PTXP may include hashing the next bits of the AAA for the new PD being inserted by obtaining the 4 next most significant bits of the Absolute_Address and multiply by 2. When at least one, but less than four, Absolute_Address bits remain, sufficient zeros are concatenated on the left to arrive at four bits. Step 7 of the method for defining PTXP may include that if hash of the next bits of AAA addresses collides with the existing PD, go to step 2. Else create the new PD as an entry in the most recent PTX (see Define a PD Algorithm). Step 8 of the method for defining PTXP may include releasing software lock associated with PT.PTE.

Figure 6:
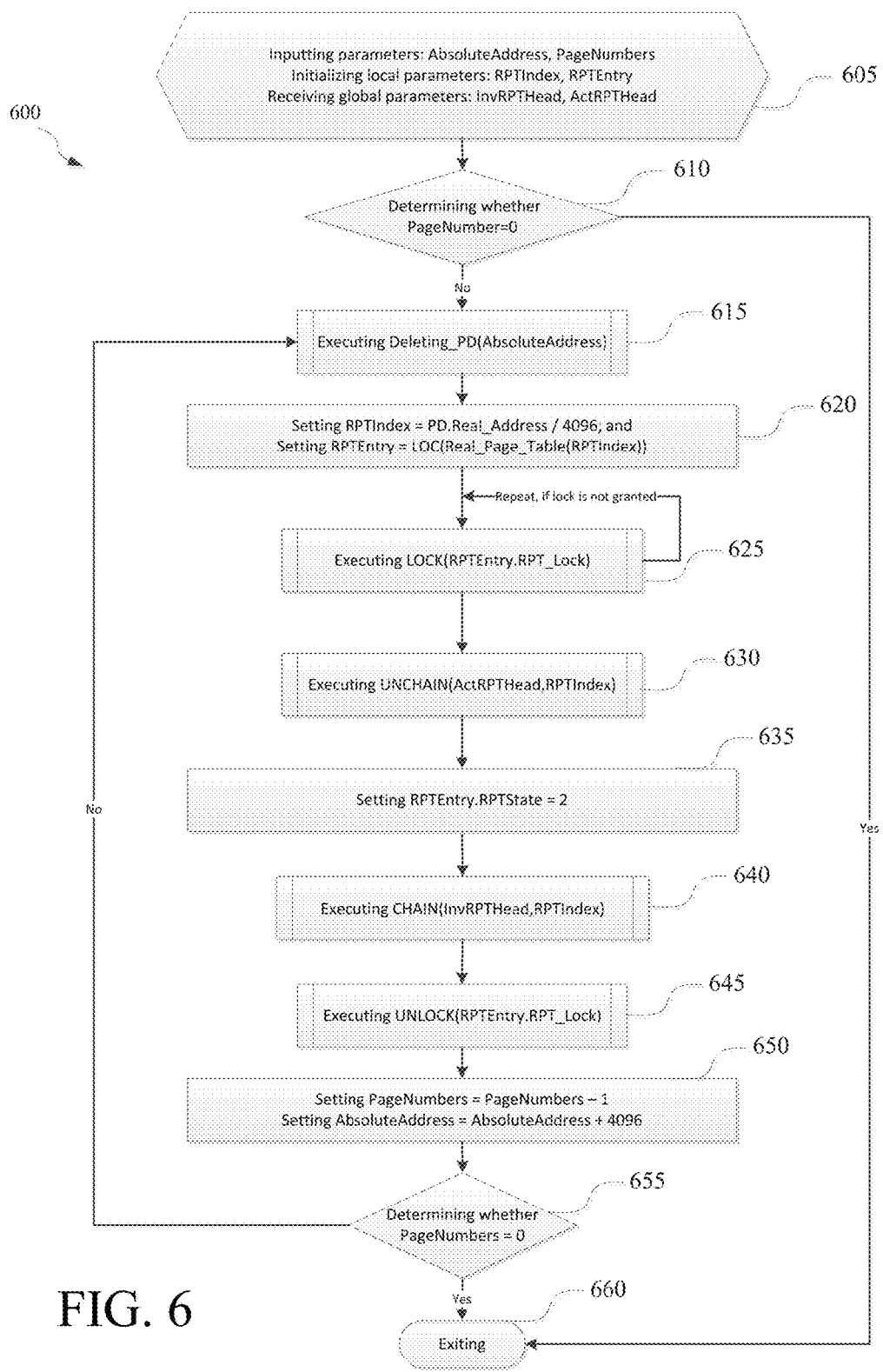
FIG. 6 shows an exemplary method for page invalidation according to one embodiment of the disclosure.

FIG. 6 shows an exemplary method 600 for page invalidation according to one embodiment of the disclosure. The method 600 may include the Page_Descriptor 100 in FIG. 1. The method 600 may include the Page_Exception_PTE 200 in FIG. 2. The method 600 may include the Page_Table_Extension_Pointer 300 in FIG. 3. The method 600 may include the Real Page Table (RPT) Entry 400 in FIG. 4. The method 600 may include the Page Invalidate Table Packet 500 in FIG. 5. The method 600 may be used in combination with the method 700 in FIG. 7. The method 600 may be used in combination with the method 800 in FIG. 8. The method 600 may be used in combination with the method 900 in FIG. 9. The method 600 may be used in combination with the method 1000 in FIG. 10. The method 600 may include the data structures 1100 in FIG. 11. The method 600 may be implemented in the computer network 1200 in FIG. 12. The data method 600 may be implemented in the computer system 1300. The method 600 may be implemented in the server 1400 in FIG. 14A. The method 600 may be implemented in the server 1450 in FIG. 14B.

As shown in FIG. 6, the method 600 for page invalidation releases the memory occupied by the specified Absolute_Address, deletes the page's Page Descriptor (PD), and places the page on the page invalidate chain.

At 605, the method 600 includes inputting parameters: AbsoluteAddress and PageNumbers. At 605, the method 600 includes initializing a local parameter: RPTIndex, which is an index into the Real Page Table. At 605, the method 600 includes initializing a local parameter: RPTEntry, which is a pointer to a Real Page Table entry. At 605, the method 600 includes receiving a global parameter: InvRPTHead, which is the head link for the Page Invalidate chain. At 605, the method 600 includes receiving a global parameter: ActRPTHead, which is the head link of the active RPT chain.

At 610, the method 600 determines whether PageNumbers equals 0. If "yes," the method proceeds to 660. If "no," the method proceeds to 615.

At 615, the method 600 deletes the absolute address specified. In one embodiment, the method 600 executes Delete_PD (AbsoluteAddress).

At 620, the method 600 sets RPTIndex:=PD.Real_Address/4096. At 620, the method 600 also sets RPTEntry:=LOC(Real_Page_Table(RPTIndex)). (Question: Please define instruction "LOC." Is "LOC" the same as "LOCK?")

At 625, the method 600 executes the command LOCK (RPTEntry.RPT_Lock). If lock is not granted, the method 600 waits and repeats 625. At 625, RPTEntery.RPT is locked from further accessing by other IPs and/or computer programs.

At 630, the method 600 executes the command UNCHAIN(ActRPTHead,RPTIndex) from the active chain. At 630, RPTIndex is unchained from ActRPTHead, an active chain.

At 635, the method sets RPTEntry.RPT_State:=2.

At 640, the method 600 executes CHAIN(InvRPTHead, RPTIndex) to the page invalidate chain. At 640, the method 600 chains RPTIndex to InvRPTH, an invalidation chain.

At 645, the method 600 executes UNLOCK(RPTEntry.RPT_Lock). At 645, the RPTEntry.RPT_Lock is unlocked.

At 650, the method 600 sets PageNumbers:=PageNumbers−1. At 650, the method 600 sets AbsoluteAddress:=AbsoluteAddress+4096.

At 655, the method 600 determines whether PageNumbers equals zero. If PageNumbers is not zero, go to 615. If PageNumbers is zero, go to 660.

At 660, the method 600 exits.

Figure 7:
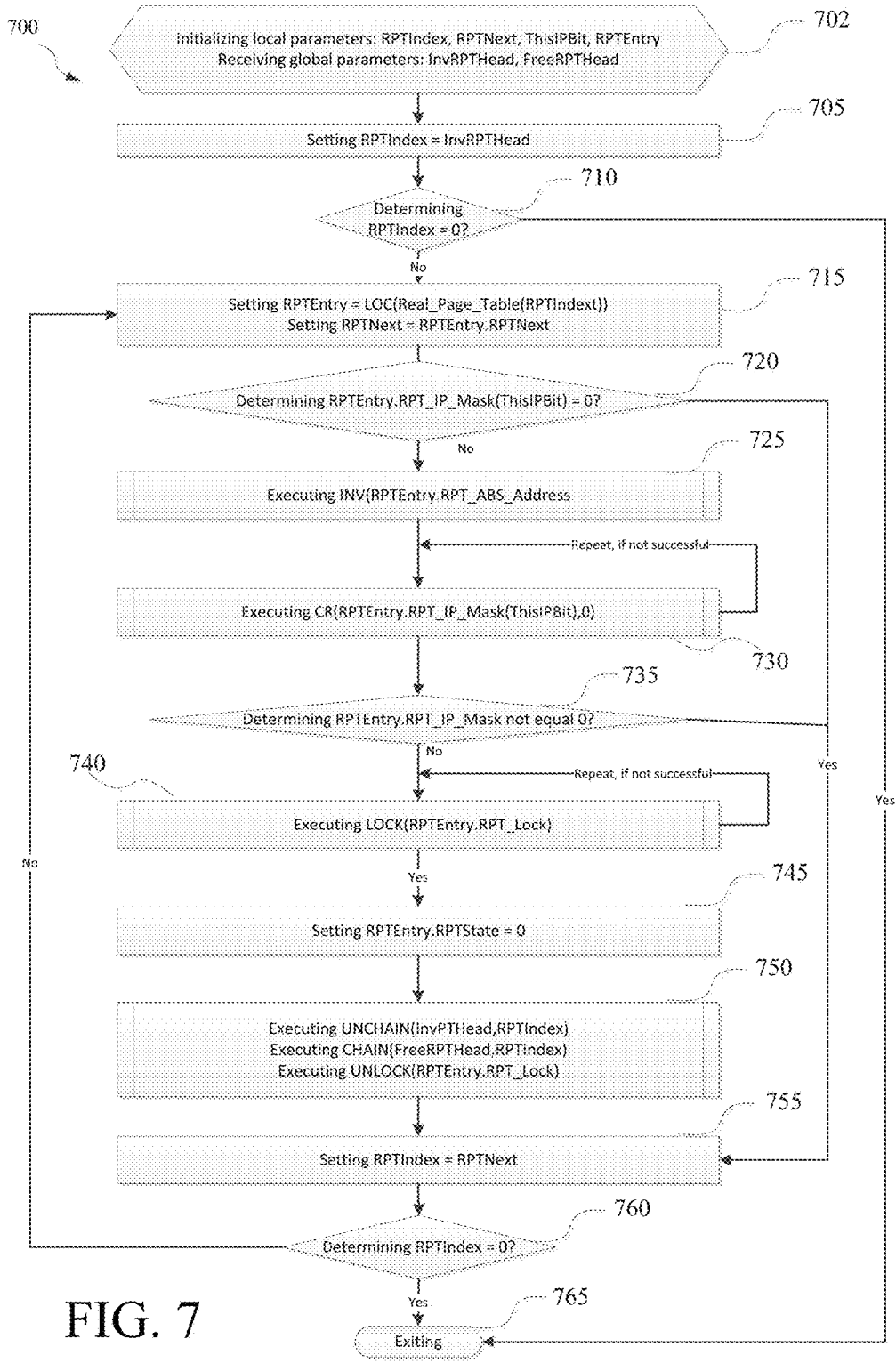
FIG. 7 shows an exemplary method for page invalidation according to one embodiment of the disclosure.

FIG. 7 shows an exemplary method 700 for page invalidation according to one embodiment of the disclosure. The method 700 may include the Page_Descriptor 100 in FIG. 1. The method 700 may include the Page_Exception_PTE 200 in FIG. 2. The method 700 may include the Page_Table_Extension_Pointer 300 in FIG. 3. The method 700 may include the Real Page Table (RPT) Entry 400 in FIG. 4. The method 700 may include the Page Invalidate Table Packet 500 in FIG. 5. The method 700 may be used in combination with the method 600 in FIG. 6. The method 700 may be used in combination with the method 800 in FIG. 8. The method 700 may be used in combination with the method 900 in FIG. 9. The method 700 may be used in combination with the method 1000 in FIG. 10. The method 700 may include the data structures 1100 in FIG. 11. The method 700 may be implemented in the computer network 1200 in FIG. 12. The data method 700 may be implemented in the computer system 1300. The method 700 may be implemented in the server 1400 in FIG. 14A. The method 700 may be implemented in the server 1450 in FIG. 14B.

The method 700 invalidates the page descriptors in the TLB for the current IP. After the page is invalidated, it is determined if all other active IPs invalidated the page yet. If so, the page's RPT entry is removed from the page invalidate chain and placed on the free chain.

At 702, the method 700 includes initializing local parameters: RPTIndex, which is the index into the Real Page Table; RPTEntry, which is a pointer to a Real Page Table entry; RPTNext, which is the next index into the RPT Table; and ThisIPBit, which is the bit in the IP_Mask that represents this IP.

At 702, the method 700 includes receiving global parameter InvRPTHead, which is the head link for the Page Invalidate chain; and FreeRPTHead, which is the head link for the free RPT chain.

At 705, the method 700 includes setting RPTIndex=InvRPTHead.

At 710, the method 700 includes determining whether RPTIndex=0. If RPTIndex=0, the method 700 proceeds to 765. If RPTIndex is not equal to 0, the method 700 proceeds to 715.

At 715, the method 700 includes setting RPTEntry=LOC (Real_Page_Table(RPTIndex)). The method 700 includes setting RPTNext=RPTEntry.RPTNext. (Question: Please define instruction "LOC." Is "LOC" the same as "LOCK?")

At 720, the method 700 includes determining whether RPTEntry.RPT_IP_Mask(ThisIPBit)=0. If RPTEntry.RPT_IP_Mask(ThisIPBit)=0, the method 700 proceeds to 755. If RPTEntry.RPT_IP_Mask(ThisIPBit) is not 0, the method 700 proceeds to 725.

At 725, the method 700 includes executing INV(RPTEntry.RPT_ABS_Address) to invalidate the IP's TLB.

At 730, the method 700 includes executing CR(RPTEntry.RPT_IP_Mask(ThisIPBit),0). If execution is unsuccessful, the method 700 waits and repeats 730.

At 735, the method 700 includes determining whether RPTEntry.RPT_IP_Mask not equal to 0. If RPTEntry.RPT_IP_Mask not equal to 0, the method 700 proceeds to 755. If RPTEntry.RPT_IP_Mask equals to 0, the method 700 proceeds to 740. RPTEntry.RPT_IP_Mask being equal to 0 indicates that all other IPs in the system have invalidated the page in interest. When RPTEntry.RPT_IP_Mask equals to 0, the method 700 can proceed to unchain the RPT from its active RPT chain and chain the RPT into a free RPT chain, e.g., at 750.

At 740, the method 700 includes executing LOCK(RPTEntry.RPT_lock). If lock is not granted, the method 700 waits and repeats 740.

At 745, the method 700 includes setting RPTEntry.RPT_State=0.

At 750, the method 700 includes executing UNCHAIN (InvRPTHead,RPTIndex). At 750, the method 700 includes executing CHAIN(FreeRPTHead,RPTIndex). At 750, the method 700 includes executing UNLOCK(RPTEntry.RPT_Lock).

At 755, the method 700 includes setting RPTIndex:= RPTNext.

At 760, determining whether RPTIndex is equal to 0. If RPTIndex is not equal to 0, the method 700 proceeds to 715. If RPTIndex is equal to 0, the method 700 proceeds to 765

At 765, the method 700 exits.

Figure 8:
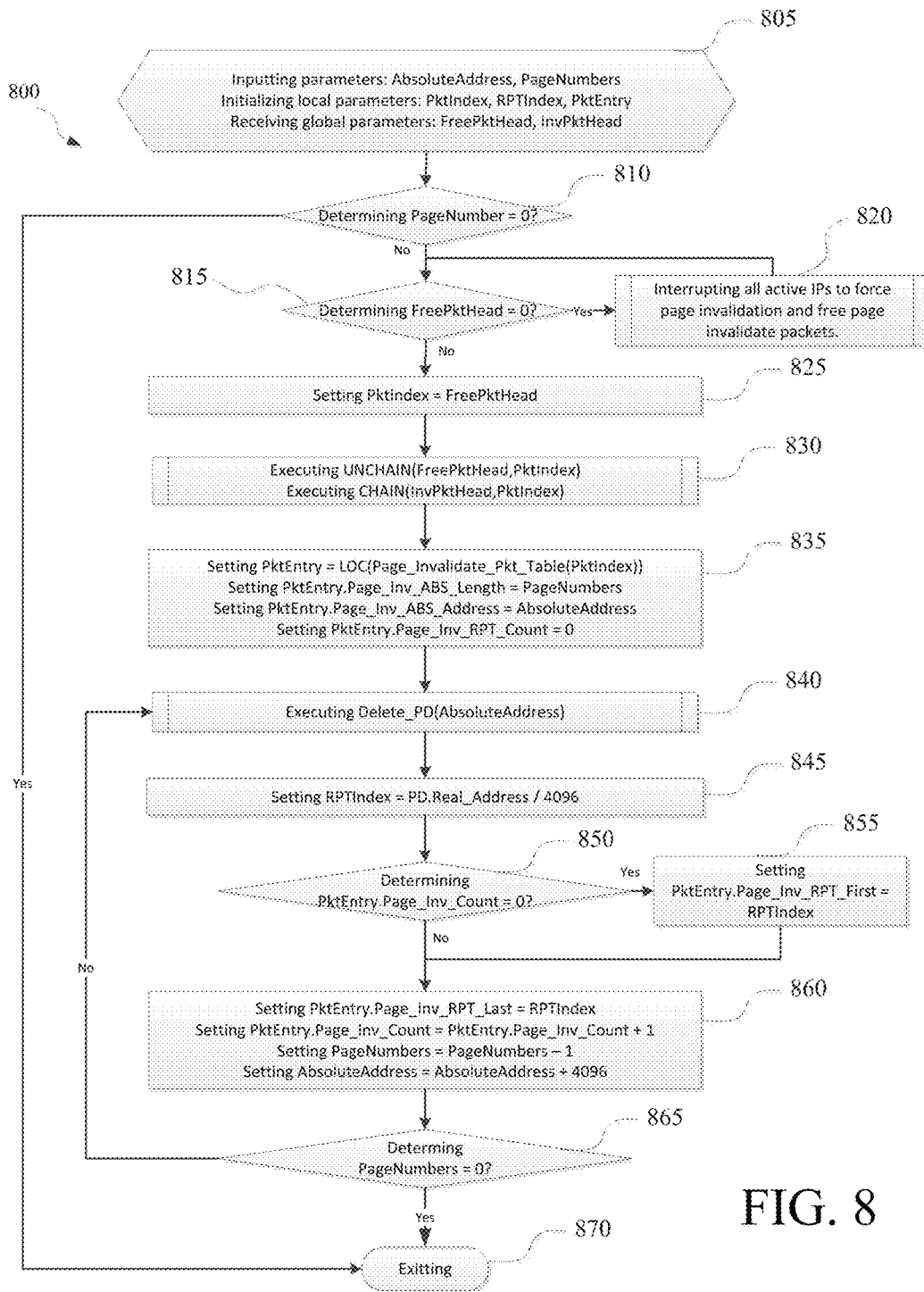
FIG. 8 shows an exemplary method for page invalidation according to one embodiment of the disclosure.

FIG. 8 shows an exemplary method 800 for page invalidation according to one embodiment of the disclosure. The method 800 may include the Page_Descriptor 100 in FIG. 1. The method 800 may include the Page_Exception_PTE 200 in FIG. 2. The method 800 may include the Page_Table_Extension_Pointer 300 in FIG. 3. The method 800 may include the Real Page Table (RPT) Entry 400 in FIG. 4. The method 800 may include the Page Invalidate Table Packet 500 in FIG. 5. The method 800 may be used in combination with the method 600 in FIG. 6. The method 800 may be used in combination with the method 700 in FIG. 7. The method 800 may be used in combination with the method 900 in FIG. 9. The method 800 may be used in combination with the method 1000 in FIG. 10. The method 800 may include the data structures 1100 in FIG. 11. The method 800 may be implemented in the computer network 1200 in FIG. 12. The data method 800 may be implemented in the computer system 1300. The method 800 may be implemented in the server 1400 in FIG. 14A. The method 800 may be implemented in the server 1450 in FIG. 14B.

The method 800 releases the memory occupied by the specified Absolute_Address, deletes the page's Page Descriptor (PD), and places the page on the page invalidate chain.

At 805, the method 800 includes inputting parameters: AbsoluteAddress, PageNumbers.

At 805, the method 800 includes initializing a local parameter: PktIndex, which is an index into the Page invalidate table. At 805, the method 800 includes initializing a local parameter. RPTIndex, which is an index into the Real Page Table. At 805, the method 800 includes initializing a local parameter: PktEntry, which is a pointer to a Page Invalidate Table entry. At 805, the method 800 includes receiving a global parameter: FreePktHead, which is the head link for the free Page Invalidate chain. At 805, the method 800 includes a global parameter: InvPktHead, which is the head link for the active Page Invalidate chain.

At 810, the method 800 includes determining whether PageNumbers=0. If "yes," the method 800 proceeds to 870. If "no," the method 800 proceeds to 815.

At 815, the method 800 includes determining whether FreePktHead=0. If "yes," the method 800 proceeds to 820. If "no," the method proceeds to 825.

At 820, the method 800 includes interrupting all active IPs in the system to force page invalidation, wait, and go back to 815. At 820, page invalidate packet may also be freed.

At 825, the method 800 includes setting PktIndex:=FreePktHead.

At 830, the method 800 includes executing UNCHAIN (FreePktHead,PktIndex). At 830, the method 800 includes executing CHAIN(InvPktHead,PktIndex).

At 835, the method 800 includes setting PktEntry=LOC (Page_Inv_Table(PktIndex)). At 835, the method 800 includes setting PktEntry.Page_Inv_ABS_Length=PageNumbers. At 835, the method 800 includes setting PktEntry.Page_Inv_ABS_Address=AbsoluteAddress. At 835, the method 800 includes setting PktEntry.Page_Inv_RPT_Count=0.

At 840, the method 800 includes executing Delete_PD (AbsoluteAddress).

At 845, the method 800 includes setting RPTIndex=PD.Real_Address/4096.

At 850, the method 800 includes determining whether PktEntry.Page_Inv_RPT_Count equal 0. If "yes," the method 800 proceeds to 855. If "no," the method proceeds to 860.

At 855, the method 800 includes setting PktEntry.Page_Inv_RPT_First=RPTIndex.

At 860, the method 800 includes setting PktEntry.Page_Inv_RPT_Last=RPTIndex. At 860, the method 800 includes setting PktEntry.Page_Inv_RPT_Count=PktEntry.Page_Inv_RPT_Count+1. At 860, the method 800 includes setting PageNumbers=PageNumbers−1. At 860, the method 800 includes setting AbsoluteAddress=AbsoluteAddress+4096.

At 865, the method 800 includes determining whether PageNumbers equal 0. If "yes," the method 800 proceeds to 870. If "no," the method 800 proceeds to 840.

At 870, the method 800 includes exiting the method 800.

Figure 9:
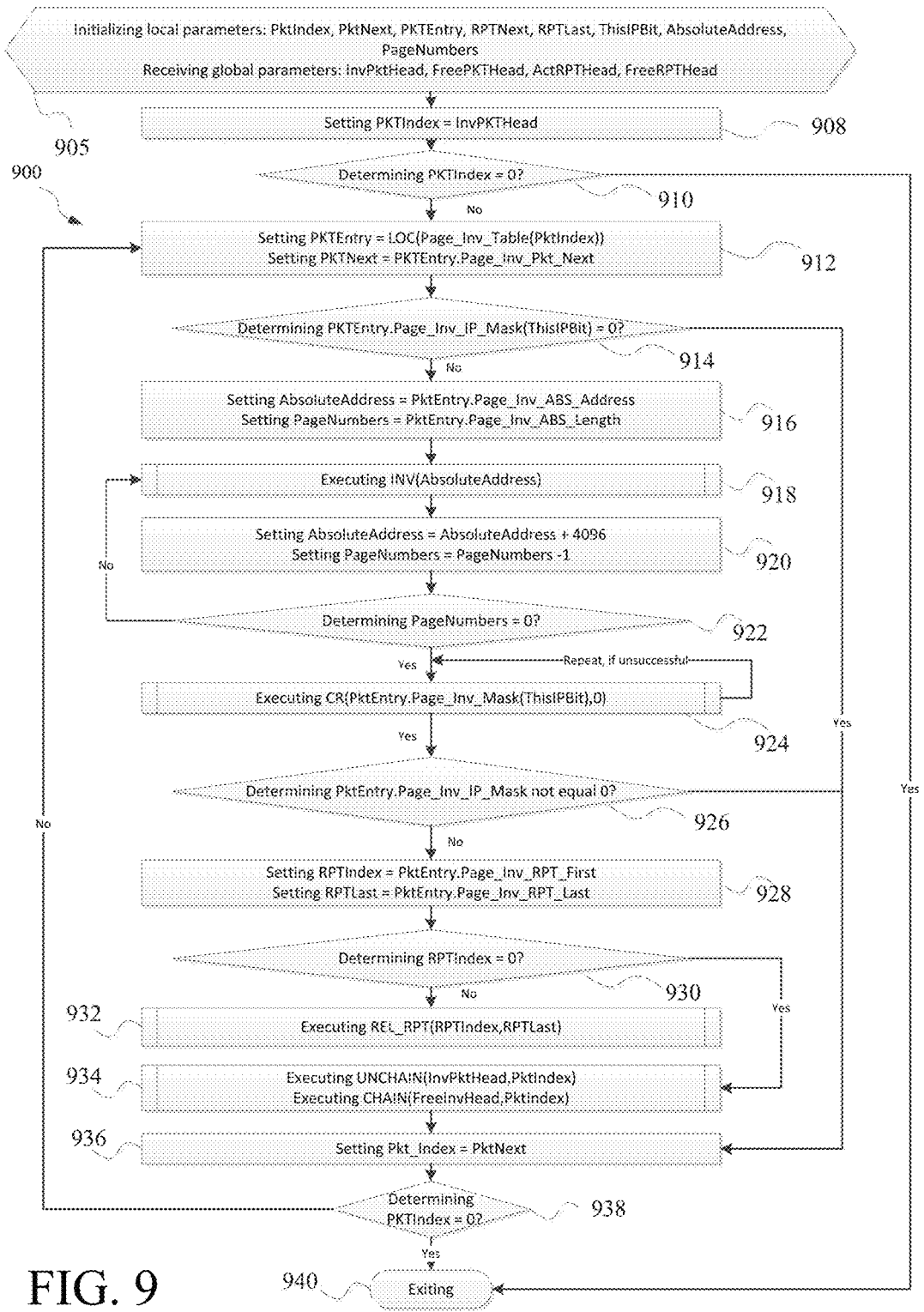
FIG. 9 shows an exemplary method for page invalidation according to one embodiment of the disclosure.

FIG. 9 shows an exemplary method 900 for page invalidation according to one embodiment of the disclosure. The method 900 may include the Page_Descriptor 100 in FIG. 1. The method 900 may include the Page_Exception_PTE 200 in FIG. 2. The method 900 may include the Page_Table_Extension_Pointer 300 in FIG. 3. The method 900 may include the Real Page Table (RPT) Entry 400 in FIG. 4. The method 900 may include the Page Invalidate Table Packet 500 in FIG. 5. The method 900 may be used in combination with the method 600 in FIG. 6. The method 900 may be used in combination with the method 700 in FIG. 7. The method 900 may be used in combination with the method 800 in FIG. 8. The method 900 may be used in combination with the method 1000 in FIG. 10. The method 900 may include the data structures 1100 in FIG. 11. The method 900 may be implemented in the computer network 1200 in FIG. 12. The data method 900 may be implemented in the computer system 1300. The method 900 may be implemented in the server 1400 in FIG. 14A. The method 900 may be implemented in the server 1450 in FIG. 14B.

The method 900 invalidates the page descriptors in the TLB for the current IP. After the page is invalidated, it is determined if all other active IPs invalidated the page yet, by checking the mask. If so, the page's RPT entry is removed from the page invalidate chain and placed on the free chain.

At 905, the method 900 initializes local parameters: PktIndex, which is an index into the page invalidate table; PktNext, which is the next index into the page invalidate table; PktEntry, which is a pointer to a Page Invalidate Table entry; RPTIndex, which is an index into the Real Page Table; RPTNext, which is the next index into the Real Page Table; RPTLast, which is the last index of the Real Page Table chain; RPTEntry, which is a pointer to a Real Page Table entry; ThisIPBit, which is the bit in the IP_Mask that represents this IP; AbsoluteAddress, which is the absolute address to be invalidated; and PageNumbers, which is the number of pages to invalidate.

At 905, the method 900 receives global parameters: InvPktHead, which is the head link for the Page Invalidate chain; FreePktHead, which is the head link for the free Page Invalidate chain; ActRPTHead, which is the head link of the active RPT chain; and FreeRPTHead, which is the head link of the free RPT chain.

At 908, the method 900 includes setting PktIndex=InvPktHead.

At 910, the method 900 includes determining whether PktIndex=0. If "yes," the method 900 proceeds to 940. If "no," the method 900 proceeds to 912.

At 912, the method 900 includes setting PktEntry=LOC(Page_Inv_Table(PktIndex)) and setting PktNext=PktEntry.Page_Inv_Pkt_Next. (Question: please define instruction "LOC.")

At 914, the method 900 includes determining whether PktEntry.Page_Inv_IP_Mask(ThisIPBit)=0. If "yes," the method 900 proceeds to 936. If "no," the method 900 proceeds to 916.

At 916, the method 900 includes setting AbsoluteAddress=PktEntry.Page_Inv_ABS_Address, and setting PageNumbers=PktEntry. Page_Inv_ABS_Length.

At 918, the method 900 includes executing INV(AbsoluteAddress) to invalidate the IP's TLB.

At 920, the method 900 includes setting AbsoluteAddress=AbsoluteAddress+4096 and setting PageNumbers=PageNumbers−1.

At 922, the method 900 includes determining whether PageNumbers equal 0. the If "no," the method 900 proceeds to 918. If "yes," the method 900 proceeds to 924.

At 924, the method 900 includes executing CR(PktEntry.Page_Inv_IP_Mask(ThisIPBit),0). If the execution is unsuccessful, the method 900 waits and repeats 924.

At 926, the method 900 includes determining whether PktEntry.Page_Inv_IP_Mask not equal 0. If "yes," the method 900 proceeds to 936. If "no," the method 900 proceeds to 928. The PktEntry.Page_Inv_IP_Mask includes a plurality of bits, each bit correspond to one other IP in a multiprocessor computing system. The bits of the mask have two states: status zero and status one. Status zero indicates the corresponding IP has invalided the page in interest. Status one indicates the corresponding IP has not invalidated the page in interest yet. All bits in the mask must be zero before the RPT entry can be unchained from an active RPT chain and chained into a free page list. All bits in the IP mask being zero can be validated by the instruction RPT_INV (Real Page Table Invalidation) as TRUE. Updates of the bits of the mask must be made using the CR (Conditional Replace) instruction.

At 928, the method 900 includes setting RPTIndex=PktEntry.Page_Inv_RPT_First and setting RPTLast=PktEntry.Page_Inv_RPT_Last.

At 930, the method 900 includes determining whether RPTIndex=0. If "yes," the method 900 proceeds to 934. If "no," the method 900 proceeds to 932.

At 932, the method 900 includes executing REL_RPT(RPTIndex,RPTLast). REL_RPT(RPTIndex,RPTLast) is a method of releasing Real Page Table (RPT). In one embodiment, the REL_RPT(RPTIndex,RPTLast) at 932 is the method 1000 in FIG. 10. At 932, the method of REL_RPT(RPTIndex,RPTLast) releases multiple RPTs by unchaining the RPTs from the active RPT chain and chaining the RPTs into a free RPT chain. At 932, the method the REL_RPT(RPTIndex,RPTLast) is configured release multiple RPTs all at once simultaneously in a batch with a single PKTEntry. This is also known as "batching" or "batch invalidation."

At 934, the method 900 includes executing UNCHAIN(InvPktHead,PktIndex) and CHAIN(FreeInvHead,PktIndex).

At 936, the method 900 includes setting PktIndex=PktNext.

At 938, the method 900 includes determining PKTIndex equal 0. If "yes," the method 900 proceeds to 940. If "no," the method 900 proceeds to 912.

At 940, the method 900 includes exiting.

Figure 10:
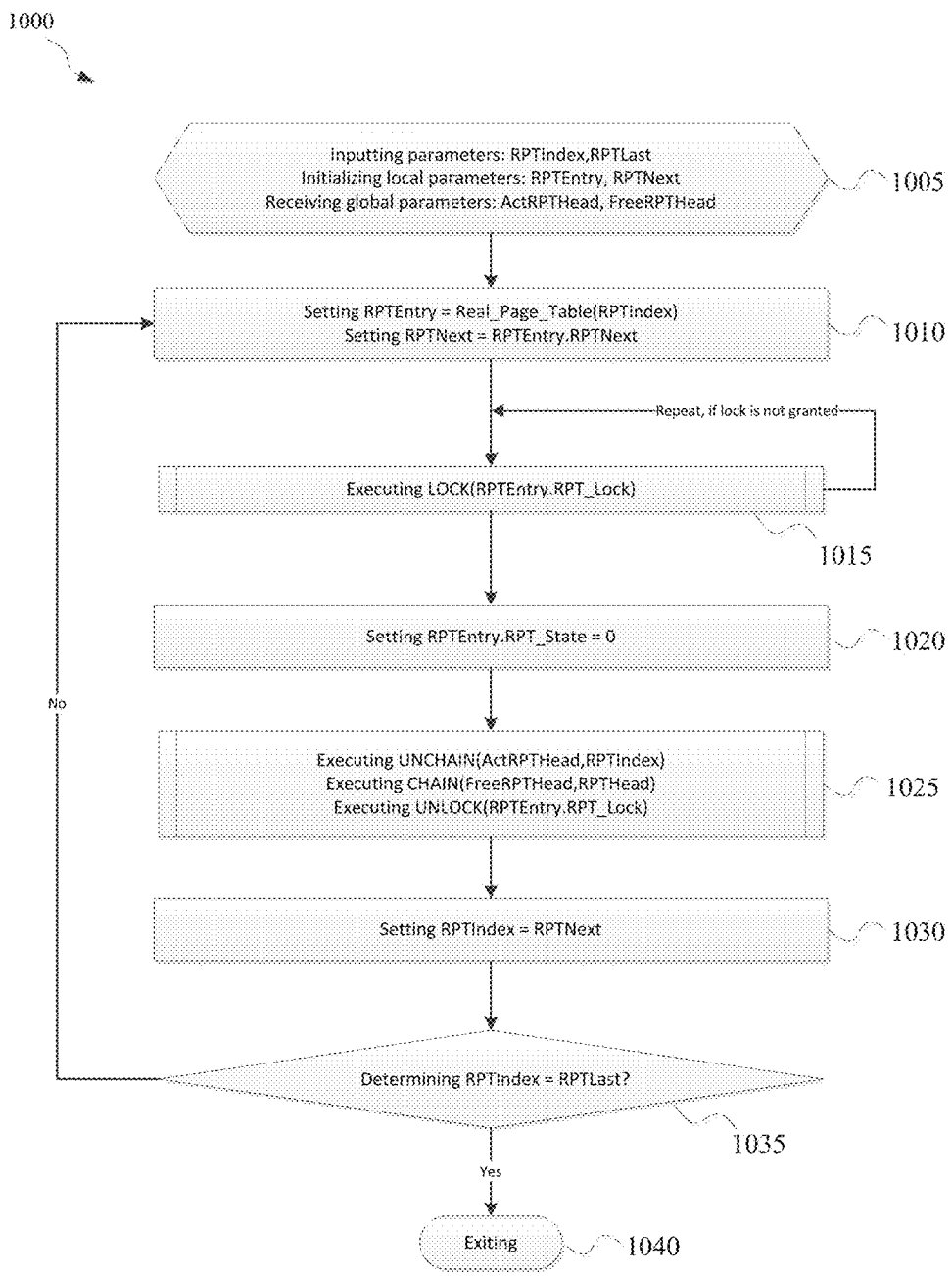
FIG. 10 shows an exemplary method for releasing Real Page Table (RPT) according to one embodiment of the disclosure.

FIG. 10 shows an exemplary method 1000 for releasing Real Page Table (RPT) according to one embodiment of the disclosure. The method 1000 may include the Page_Descriptor 100 in FIG. 1. The method 1000 may include the Page_Exception_PTE 200 in FIG. 2. The method 1000 may include the Page_Table_Extension_Pointer 300 in FIG. 3. The method 1000 may include the Real Page Table (RPT) Entry 400 in FIG. 4. The method 1000 may include the Page Invalidate Table Packet 500 in FIG. 5. The method 1000 may be used in combination with the method 600 in FIG. 6. The method 1000 may be used in combination with the method 700 in FIG. 7. The method 1000 may be used in combination with the method 800 in FIG. 8. The method 1000 may be used in combination with the method 900 in FIG. 9. The method 1000 may include the data structures 1100 in FIG. 11. The method 1000 may be implemented in the computer network 1200 in FIG. 12. The data method 1000 may be implemented in the computer system 1300. The method 1000 may be implemented in the server 1400 in FIG. 14A. The method 1000 may be implemented in the server 1450 in FIG. 14B.

In one embodiment, the method 1000 can be the Rel_RPT function in 932 of FIG. 9. The method 1000 releases multiple RPTs in interest by unchaining the RPTs from the active RPT chain and chaining the RPTs into a free RPT chain. The method 1000 is configured to release multiple RPTs all at once simultaneously in a batch according to a single PKT entry (e.g., the PKTEntry in 905). This is also known as "batching" or "batch invalidation."

At 1005, the method 1000 includes inputting parameters: RPTIndex, which is an index into the Real Page Table; and RPTLast, which is the last index of the Real Page Table chain.

At 1005, the method 1000 includes initializing local parameters: RPTEntry, which is a pointer to a Real Page Table entry; and RPTNext, which is the next index into the Real Page Table.

At 1005 the method 1000 includes receiving global parameters: ActRPTHead, which is the head link of the active RPT chain; and FreeRPTHead, which is the head link of the free RPT chain.

At 1010, the method 1000 includes setting RPTEntry=Real_Page_Table(RPTIndex). At 1010, the method 1000 includes setting RPTNext=RPTEntry.RPTNext.

At 1015, the method 1000 includes executing LOCK (RPTEntry.RPT_Lock). If lock is not granted, the method 1000 repeats 1015.

1020, the method 1000 includes setting RPTEntry.RPT_State=0.

At 1025, the method 1000 includes executing UNCHAIN (ActRPTHead,RPTIndex). At 1025, the method 1000 includes executing CHAIN(FreeRPTHead,RPTIndex). At 1025, the method 1000 includes executing UNLOCK(RPTEntry.RPT_Lock).

At 1030, the method 1000 includes setting RPTIndex=RPTNext.

At 1035, the method 1000 includes determining whether RPTIndex equal RPTLast. If "yes," the method 1000 has released all RPTs in interest and proceeds to 1040. If "no," the method 1000 proceeds to 1010.

At 1040, the method 1000 includes exiting.

Figure 11:
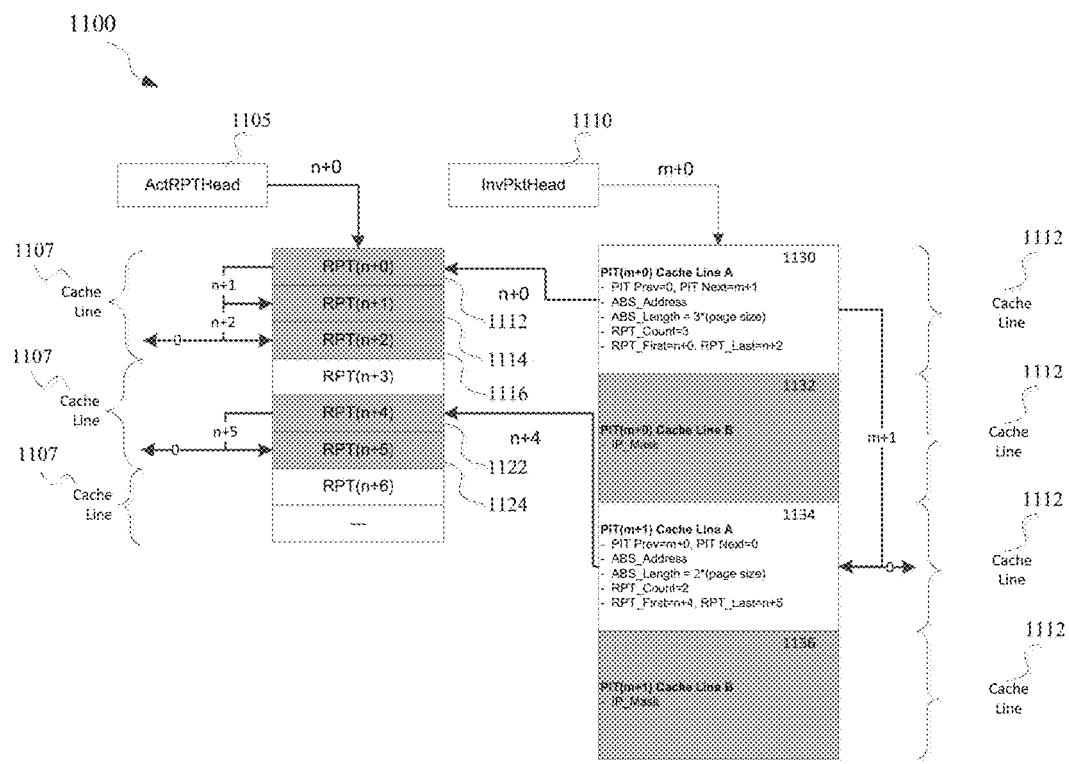
FIG. 11 shows schematic data structures for page invalidation according to one embodiment.

FIG. 11 shows schematic data structures 1100 configured for page invalidation according to one embodiment. The data structures 1100 may include the Page_Descriptor 100 in FIG. 1. The data structures 1100 may include the Page_Exception_PTE 200 in FIG. 2. The data structures 1100 may include the Page_Table_Extension_Pointer 300 in FIG. 3. The data structures 1100 may include the Real Page Table (RPT) Entry 400 in FIG. 4. The data structures 1100 may include the Page Invalidate Table Packet 500 in FIG. 5. The data structures 1100 may be used in the method 600 in FIG. 6. The data structures 1100 may be used in the method 700 in FIG. 7. The data structures 1100 may be used in the method 900 in FIG. 9. The data structures 1100 may be used in the method 1000 in FIG. 10. The data structures 1100 may be used in the computer network 1200 in FIG. 12. The data structures 1100 may be used in the computer system 1300. The data structures 1100 may be used in the server 1400 in FIG. 14A. The data structures 1100 may be used in the server 1450 in FIG. 14B.

As shown in FIG. 11, the data structures 1100 include ActRPTHead 1105, which is a head link of an active RPT chain stored in a cache line 1107. The active RPT chain includes RPT(n+0), RPT(n+1), RPT(n+2), RPT(n+3), RPT (n+4), RPT(n+5), RPT(n+6), etc.

As shown in FIG. 11, the data structures 1100 include a InvPktHead, which is a head link for the Page Invalidate chain stored in a cache line 1112. The Page invalidate chain includes Page Invalidate Table (PIT) entries, e.g., PIT (m+0) including 1130 (structure 1) and 1132 (structure 2), PIT (m+1) including 1134 (structure 1) and 1136 (structure 2).

As shown in FIG. 11, one PIT entry, e.g., PIT (m+0) or PIT (m+1), includes two data structures. The first data structure, e.g., PIT (m+0) Cache Line A 1130 and PIT (m+1) Cache Line A 1134 contains data that is only read by the current IP running the page invalidate chain. The second data structure, e.g., PIT (m+0) Cache Line B 1132 and PIT (m+1) Cache Line B 1136, contains the mask of IPs that need to invalidate the absolute address range specified in the first data structure 1130, 1134.

In one embodiment, PIT (m+0) Cache Line A 1130 and PIT (m+1) Cache Line A 1134, support batching, invalidating a group of RPTs simultaneously using a single PIT.

As shown in FIG. 11, PIT (m+0) Cache Line A 1130 supports batch invalidation of RPT(n+0) 1112, RPT(n+1) 1114, and RPT(n+2) 1116. In 1130, PIT Prev includes an index to the previous PIT in the page invalidation chain. In 1130, PIT Next includes an index to the next PIT in the page invalidation chain. PIT (m+0) Cache Line A 1130 defines the absolute addresses to be invalidated in ABS_Address. PIT (m+0) Cache Line A 1130 defines the length of the absolute addresses to be invalidated in ABS_Length, which is 3*(page size). PIT (m+0) Cache Line A 1130 defines RPT_Count=3, which means total number of RPTs to be invalidated in this batch is three. PIT (m+0) Cache Line A 1130 defines RPT_First=n+0, which means the first RPT to be invalidated in this batch is RPT(n+0). PIT (m+0) Cache Line A 1130 defines RPT_Last=n+2, which means the last RPT to be invalidated in this batch is RPT(n+2).

As shown in FIG. 11, PIT (m+1) Cache Line A 1134 supports batch invalidation of RPT(n+4) 1122 and RPT(n+5) 1124. In 1134, PIT Prev includes an index linking to the previous PIT in the page invalidation chain. In 1130, PIT Next includes an index linking to the next PIT in the page invalidation chain. PIT (m+1) Cache Line A 1134 defines the absolute addresses to be invalidated in ABS_Address. PIT (m+1) Cache Line A 1134 defines the length of the absolute addresses to be invalidated in ABS_Length, which is 2*(page size). PIT (m+1) Cache Line A 1134 defines RPT_Count=2, which means total number of RPTs to be invalidated in this batch is two. PIT (m+1) Cache Line A 1134 defines RPT_First=n+4, which means the first RPT to be invalidated in this batch is RPT(n+4). PIT (m+1) Cache Line A 1134 defines RPT_Last=n+5, which means the last RPT to be invalidated in this batch is RPT(n+5).

In one embodiment, PIT (m+0) Cache Line B 1132 and PIT (m+1) Cache Line B 1136 include IP_Mask. IP_Mask allows a method using the data structures 1100 to be "cache aware." In one example such catch aware method may reduce the reiterations and waiting time of page invalidation by making each IP being aware of other IPs' page invalidation statuses. In another example, such catch aware method is configured to avoid interprocessor interrupt (also known as cache miss) wherein the requested data was wrongly addressed because the address of the requested data has not been invalidated yet. In one embodiment, the mask includes a plurality of bits, each bit correspond to one other IP in a multiprocessor computing system. The bits of the mask have two states: status zero and status one. Status zero indicates the corresponding IP has invalided the page in interest. Status one indicates the corresponding IP has not invalidated the page in interest yet. All bits in the mask must be zero before the RPT entry can be unchained from an active RPT chain and chained into a free page list. All bits in the IP mask being zero can be validated by the instruction RPT_INV (Real Page Table Invalidation) as TRUE. Updates of the bits of the mask must be made using the CR (Conditional Replace) instruction.

The data structures 1100 are configured for less cache contention on the cache lines and multiple RPTs are processed by one entry in the page invalidate table (PIT). In one embodiment, the PIT (m+0) 1130, 1132 and/or PIT (m+1) 1134, 1136 can be the Page Invalidate Table Packet 500 in FIG. 5.

Any of the steps of any method disclosed herein can be processed by an instruction processor (IP). For example, any step of method 600, method 700, method 800, method 900, and method 1000 can be executed by an IP. Any of the data structures disclosed herein can be accessed, read, wrote, deleted, isolated, locked, linked, chained, unchained, u resized, initialized, and updated by an IP. For example, the Page_Descriptor 100, the Page_Exception_PTE, the Page_Table_Extension_Pointer 300, the Real Page Table (RPT) Entry 400, the Page Invalidate Table Packet 500, and the data structures 1100 can be accessed, read, wrote, deleted, isolated, locked, linked, chained, unchained, resized, initialized, and updated by an IP.

Figure 13:
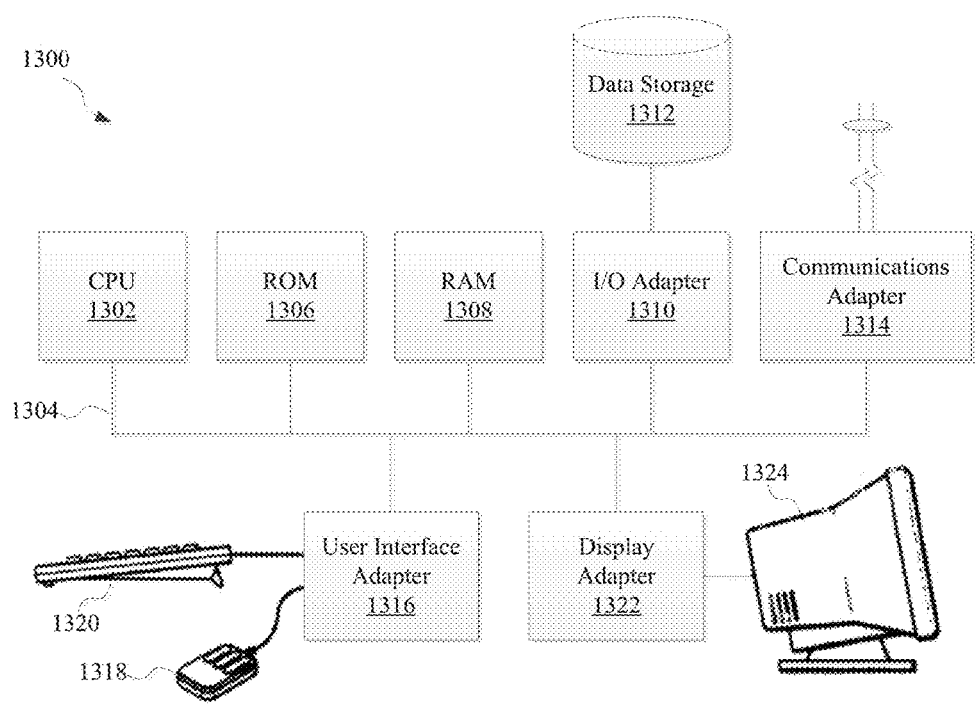
FIG. 13 shows a block diagram illustrating a computer system according to one embodiment of the disclosure.
Figure 14A:
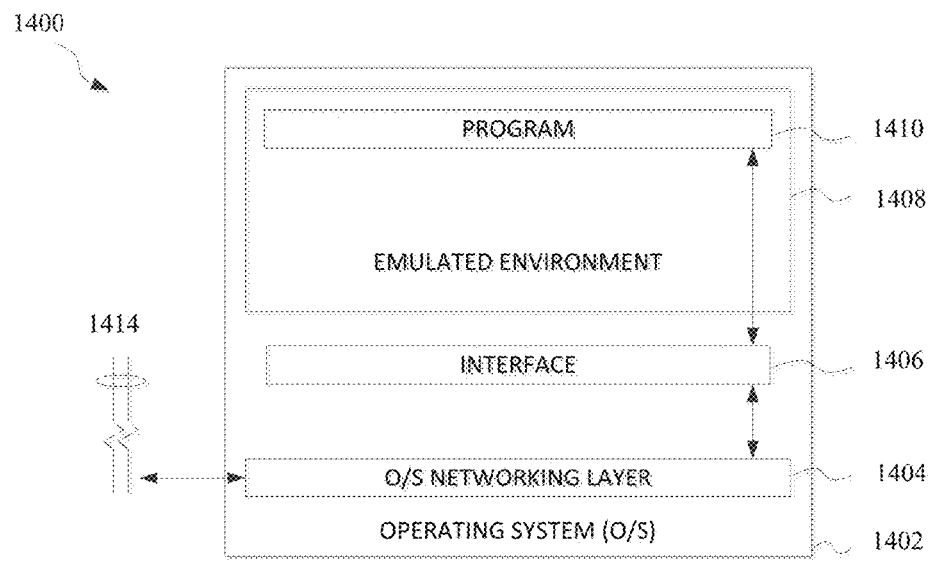
FIG. 14A shows a block diagram illustrating a server hosting an emulated software environment for virtualization according to one embodiment of the disclosure.
Figure 14B:
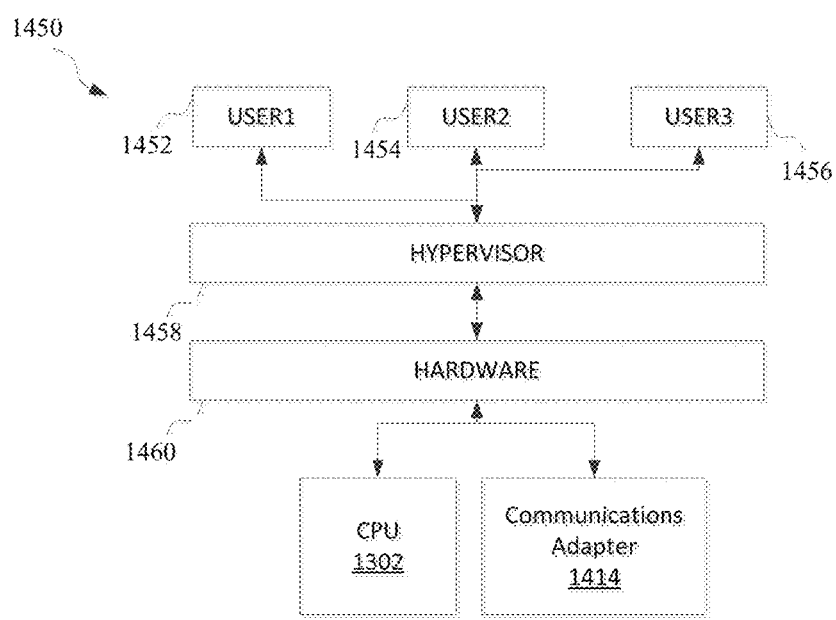
FIG. 14B shows a block diagram illustrating a server hosing an emulated hardware environment according to one embodiment of the disclosure.

It is specifically noted that any of the instruction processors (IPs) mentioned in this disclosure can be the CPU 1302 in FIG. 13 and FIG. 14B. It is also noted that the IPs mentioned in this disclosure can be emulated and exist as a software program 1410 in FIG. 14A.

Figure 12:
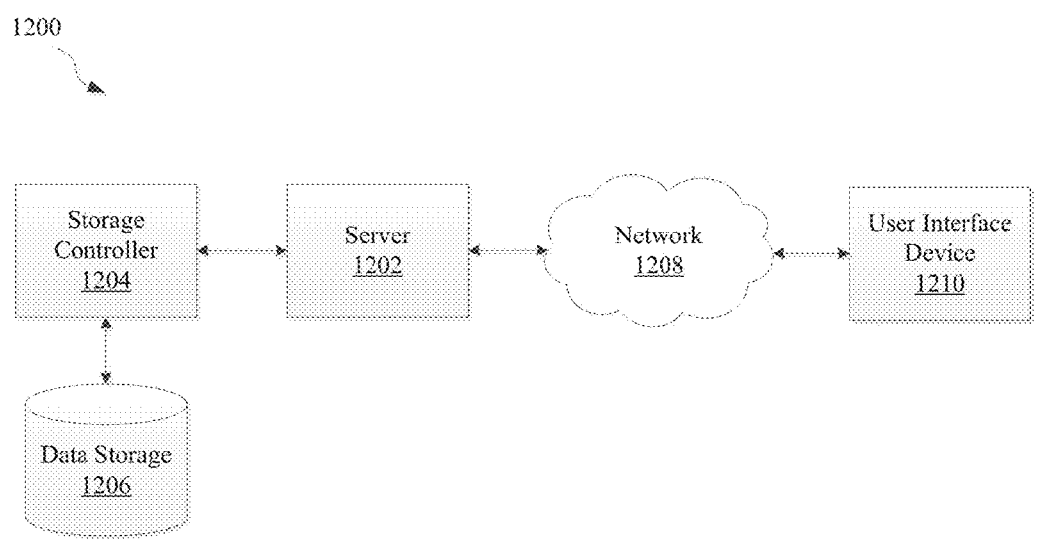
FIG. 12 shows an exemplary block diagram illustrating a computer network according to one embodiment of the disclosure.

FIG. 12 illustrates a computer network 1200 for obtaining access to database files in a computing system according to one embodiment of the disclosure. The computer network 1200 may include a server 1202, a data storage device 1206, a network 1208, and a user interface device 1210. The server 1202 may also be a hypervisor-based system executing one or more guest partitions hosting operating systems with modules having server configuration information. In a further embodiment, the computer network 1200 may include a storage controller 1204, or a storage server configured to manage data communications between the data storage device 1206 and the server 1202 or other components in communication with the network 1208. In an alternative embodiment, the storage controller 1204 may be coupled to the network 1208.

In one embodiment, the user interface device 1210 is referred to broadly and is intended to encompass a suitable processor-based device such as a desktop computer, a laptop computer, a personal digital assistant (PDA) or tablet computer, a smartphone or other mobile communication device having access to the network 1208. In a further embodiment, the user interface device 1210 may access the Internet or other wide area or local area network to access a web application or web service hosted by the server 1202 and may provide a user interface for enabling a user to enter or receive information.

The network 1208 may facilitate communications of data between the server 1202 and the user interface device 1210. The network 1208 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 1210 accesses the server 1202 through an intermediate sever (not shown). For example, in a cloud application the user interface device 1210 may access an application server. The application server fulfills requests from the user interface device 1210 by accessing a database management system (DBMS). In this embodiment, the user interface device 1210 may be a computer or phone executing a Java application making requests to a JBOSS server executing on a Linux server, which fulfills the requests by accessing a relational database management system (RDMS) on a mainframe server.

FIG. 13 illustrates a computer system 1300 adapted according to certain embodiments of the server 1202 and/or the user interface device 1210. The central processing unit ("CPU") 1302 is coupled to the system bus 1304. The CPU 1302 may be a general purpose CPU or microprocessor, graphics processing unit ("GPU"), and/or microcontroller. The present embodiments are not restricted by the architecture of the CPU 1302 so long as the CPU 1302, whether directly or indirectly, supports the operations as described herein. The CPU 1302 may execute the various logical instructions according to the present embodiments.

The computer system 1300 may also include random access memory (RAM) 1308, which may be synchronous RAM (SRAM), dynamic RAM (DRAM), synchronous dynamic RAM (SDRAM), or the like. The computer system 1300 may utilize RAM 1308 to store the various data structures used by a software application. The computer system 1300 may also include read only memory (ROM) 1306 which may be PROM, EPROM, EEPROM, optical storage, or the like. The ROM may store configuration information for booting the computer system 1300. The RAM 1308 and the ROM 1306 hold user and system data, and both the RAM 1308 and the ROM 1306 may be randomly accessed.

The computer system 1300 may also include an I/O adapter 1310, a communications adapter 1314, a user interface adapter 1316, and a display adapter 1322. The I/O adapter 1310 and/or the user interface adapter 1316 may, in certain embodiments, enable a user to interact with the computer system 1300. In a further embodiment, the display adapter 1322 may display a graphical user interface (GUI) associated with a software or web-based application on a display device 1324, such as a monitor or touch screen.

The I/O adapter 1310 may couple one or more storage devices 1312, such as one or more of a hard drive, a solid state storage device, a flash drive, a compact disc (CD) drive, a floppy disk drive, and a tape drive, to the computer system 1300. According to one embodiment, the data storage 1312 may be a separate server coupled to the computer system 1300 through a network connection to the I/O adapter 1310. The communications adapter 1314 may be adapted to couple the computer system 1300 to the network 1208, which may be one or more of a LAN, WAN, and/or the Internet. The user interface adapter 1316 couples user input devices, such as a keyboard 1320, a pointing device 1318, and/or a touch screen (not shown) to the computer system 1300. The display adapter 1322 may be driven by the CPU 1302 to control the display on the display device 1324. Any of the devices 1302-1322 may be physical and/or logical.

The applications of the present disclosure are not limited to the architecture of computer system 1300. Rather the computer system 1300 is provided as an example of one type of computing device that may be adapted to perform the functions of the server 1402 and/or the user interface device 1410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 1300 may be virtualized for access by multiple users and/or applications.

FIG. 14A is a block diagram illustrating a server 1400 hosting an emulated software environment for virtualization according to one embodiment of the disclosure. An operating system 1402 executing on a server 1400 includes drivers for accessing hardware components, such as a networking layer 1404 for accessing the communications adapter 1414. The operating system 1402 may be, for example, Linux or Windows. An emulated environment 1408 in the operating system 1402 executes a program 1410, such as Communications Platform (CPComm) or Communications Platform for Open Systems (CPCommOS). The program 1410 accesses the networking layer 1404 of the operating system 1402 through a non-emulated interface 1406, such as extended network input output processor (XNIOP). The non-emulated interface 1406 translates requests from the program 1410 executing in the emulated environment 1408 for the networking layer 1404 of the operating system 1402.

In another example, hardware in a computer system may be virtualized through a hypervisor. FIG. 14B is a block diagram illustrating a server 1450 hosting an emulated hardware environment according to one embodiment of the disclosure. Users 1452, 1454, 1456 may access the hardware 1460 through a hypervisor 1458. The hypervisor 1458 may be integrated with the hardware 1458 to provide virtualization of the hardware 1458 without an operating system, such as in the configuration illustrated in FIG. 14A. The hypervisor 1458 may provide access to the hardware 1458, including the CPU 1302 and the communications adaptor 1414.

If implemented in firmware and/or software, the functions described above may be stored as one or more instructions or code on a computer-readable medium. Examples include non-transitory computer-readable medium encoded with a data structure and computer-readable medium encoded with a computer program. Computer-readable medium includes physical computer storage media. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable medium.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising steps:
    receiving, at a processor, a first head link for a page invalidation chain, the page invalidation chain including a plurality of page invalidation tables (PITs);
    receiving, at the processor, a second head link for an active real page table (RPT) chain, the active RPT chain including a plurality of RPTs;
    accessing, by the processor, a PIT, wherein the PIT includes a first data structure and a second data structure, the first data structure further including a plurality of absolute addresses corresponding to one or more RPTs, and the second data structure further including a processor mask, wherein the
    processor mask is configured such that the processor is aware of page invalidation statuses of other processors;
    invalidating, by the processor, the plurality of RPTs, whereas the one or more RPTs are invalidated simultaneously in a batch; and
    releasing, by the processor, the plurality of RPTs to a free RPT chain, the free RPT chain includes a plurality of released RPTs.

2. The method according to claim 1, wherein the step of invalidating, by the processor, the one or more RPTs further includes unchaining, by the processor, the one or more RPTs from the active RPT chain.

3. The method according to claim 1, wherein the step of releasing, by the processor, the one or more RPTs to a free RPT chain further includes chaining, by the processor, the one or more RPTs to the free RPT chain.

4. The method according to claim 1, wherein the processor mask of the second data structure of the PIT further includes a plurality of bits, each bit corresponds to a corresponding processor.

5. The method according to claim 4, wherein each bit is either in status zero or status one, status zero indicates the corresponding processor has already invalidated the one or more RPTs, status one indicates the corresponding processor has not invalidated the one or more RPTs.

6. The method according to claim 5, wherein all of the plurality of bits of the processor mask are in status zero before the one or more RPTs are released to the free RPT chain.

7. The method according to claim 1, wherein the first data structure further includes:
a link to a previous PIT in the page invalidation chain; and
a link to a following PIT in the page invalidation chain.

8. A computer program product, comprising:
a non-transitory computer-readable medium comprising instructions which, when executed by a processor, cause the processor to perform the steps of:
receiving a first head link for a page invalidation chain, the page invalidation chain including a plurality of page invalidation tables (PITs);
receiving a second head link for an active real page table (RPT) chain, the active RPT chain including a plurality of RPTs;
accessing a PIT, wherein the PIT includes a first data structure and a second data structure, the first data structure further including a plurality of absolute addresses corresponding to one or more RPTs, and the second data structure further including a processor mask, wherein the processor mask is configured such that the processor is aware of page invalidation statuses of other processors;
invalidating the plurality of RPTs, whereas the one or more RPTs are invalidated simultaneously in a batch; and
releasing the plurality of RPTs to a free RPT chain, the free RPT chain includes a plurality of released RPTs.

9. The computer program product of claim 8, wherein the step of invalidating the one or more RPTs further includes unchaining the one or more RPTs from the active RPT chain.

10. The computer program product of claim 8, wherein the step of releasing the one or more RPTs to a free RPT chain further includes chaining the one or more RPTs to the free RPT chain.

11. The computer program product of claim 8, wherein the processor mask of the second data structure of the PIT further includes a plurality of bits, each bit corresponds to a corresponding processor.

12. The computer program product of claim 11, wherein each bit is either in status zero or status one, status zero indicates the corresponding processor has already invalidated the one or more RPTs, status one indicates the corresponding processor has not invalidated the one or more RPTs.

13. The computer program product of claim 12, wherein all of the plurality of bits of the processor mask are in status zero before the one or more RPTs are released to the free RPT chain.

14. The computer program product of claim 8, wherein the first data structure further includes:
a link to a previous PIT in the page invalidation chain; and
a link to a following PIT in the page invalidation chain.

15. An apparatus, comprising:
a memory; and
a processor coupled to the memory, the processor being configured to perform the steps of:
receiving a first head link for a page invalidation chain, the page invalidation chain including a plurality of page invalidation tables (PITs);
receiving a second head link for an active real page table (RPT) chain, the active RPT chain including a plurality of RPTs;
accessing a PIT, wherein the PIT includes a first data structure and a second data structure,
the first data structure further including a plurality of absolute addresses corresponding to one or more RPTs, and
the second data structure further including a processor mask, wherein the processor mask is configured such that the processor is aware of page invalidation statuses of other processors;
invalidating the plurality of RPTs, whereas the one or more RPTs are invalidated simultaneously in a batch; and
releasing the plurality of RPTs to a free RPT chain, the free RPT chain includes a plurality of released RPTs.

16. The apparatus of claim 15, wherein the step of invalidating the one or more RPTs further includes unchaining the one or more RPTs from the active RPT chain.

17. The apparatus of claim 15, wherein the step of releasing the one or more RPTs to a free RPT chain further includes chaining the one or more RPTs to the free RPT chain.

18. The apparatus of claim 15, wherein the processor mask of the second data structure of the PIT further includes a plurality of bits, each bit corresponds to a corresponding processor.

19. The apparatus of claim 18, wherein each bit is either in status zero or status one, status zero indicates the corresponding processor has already invalidated the one or more RPTs, status one indicates the corresponding processor has not invalidated the one or more RPTs.

20. The apparatus of claim 19, wherein all of the plurality of bits of the processor mask are in status zero before the one or more RPTs are released to the free RPT chain.

* * * * *